(12) United States Patent
Wah

(10) Patent No.: US 11,288,662 B2
(45) Date of Patent: Mar. 29, 2022

(54) SECURITY SYSTEMS AND METHODS FOR ELECTRONIC DEVICES

(71) Applicant: Chng Weng Wah, Singapore (SG)

(72) Inventor: Chng Weng Wah, Singapore (SG)

(*) Notice: Subject to any disclaimer, the term of this patent is extended or adjusted under 35 U.S.C. 154(b) by 146 days.

(21) Appl. No.: 16/362,563

(22) Filed: Mar. 22, 2019

(65) Prior Publication Data

US 2019/0287096 A1    Sep. 19, 2019

Related U.S. Application Data

(63) Continuation-in-part of application No. 15/925,710, filed on Mar. 19, 2018, now Pat. No. 10,700,868.

(60) Provisional application No. 62/683,530, filed on Jun. 11, 2018.

(51) Int. Cl.
*G06Q 20/36* (2012.01)
*G06Q 20/20* (2012.01)

(52) U.S. Cl.
CPC ....... *G06Q 20/3674* (2013.01); *G06Q 20/206* (2013.01)

(58) Field of Classification Search
None
See application file for complete search history.

(56) References Cited

U.S. PATENT DOCUMENTS

| | | | |
|---|---|---|---|
| 6,104,281 | A | 8/2000 | Heinrich |
| 6,615,353 | B1 | 9/2003 | Hashiguchi |
| 6,947,941 | B1 | 9/2005 | Koon |
| 7,275,686 | B2 | 10/2007 | Estakhri |
| 7,482,929 | B2 | 1/2009 | Bowers |
| 7,616,118 | B2 | 11/2009 | Chng |
| 7,797,164 | B2 | 9/2010 | Junger et al. |

(Continued)

FOREIGN PATENT DOCUMENTS

| | | |
|---|---|---|
| WO | WO 2000/002009 | 1/2000 |
| WO | WO 2009/102279 | 8/2009 |

OTHER PUBLICATIONS

Non-final Office Action dated Jul. 18, 2014 for U.S. Appl. No. 12/945,883, filed Nov. 14, 2010.

(Continued)

*Primary Examiner* — Carlos Garcia
(74) *Attorney, Agent, or Firm* — Sheppard, Mullin, Richter & Hampton LLP

(57) ABSTRACT

A system and method for providing security to a token, including: a digital security system generating a unique token identification code for each token to be locked; the digital security system storing in a security system database each token identification code; for a token being purchased, a point-of-sale system obtaining the unique token identification code from the token being purchased; the point-of-sale system sending the unique token identification code obtained from the token being purchased to the digital security system for activation of the token being purchased; the digital security system receiving the unique token identification code sent from the point-of-sale system and comparing the received unique token identification code with token identification codes in the security system database to authenticate the unique token identification code; and the digital security system activating the unique token identification code.

31 Claims, 20 Drawing Sheets

(56) References Cited

U.S. PATENT DOCUMENTS

| | | |
|---|---|---|
| 8,396,748 B2 | 3/2013 | Shintani |
| 8,655,309 B2 | 2/2014 | Smith |
| 8,985,465 B2 | 3/2015 | Atkinson |
| 9,136,957 B1 | 9/2015 | Napolitano |
| 9,436,770 B2 | 9/2016 | Hattrup |
| 9,641,957 B2 | 5/2017 | Raleigh |
| 2003/0092435 A1 | 5/2003 | Boivin |
| 2010/0164681 A1 | 7/2010 | Harris |
| 2011/0153441 A1 | 6/2011 | Smith |
| 2011/0155799 A1* | 6/2011 | Meszaros ............... G06Q 20/20 235/379 |
| 2012/0124388 A1 | 5/2012 | Chng et al. |
| 2013/0282588 A1* | 10/2013 | Hruska ................. G06Q 20/40 705/67 |
| 2014/0201094 A1 | 7/2014 | Herrington et al. |
| 2014/0207599 A1 | 7/2014 | Junger |
| 2016/0217356 A1 | 7/2016 | Wesby |
| 2017/0032382 A1 | 2/2017 | Shulman |
| 2018/0204260 A1 | 7/2018 | McGregor et al. |
| 2018/0365453 A1 | 12/2018 | Hartway |

OTHER PUBLICATIONS

Final Office Action dated Mar. 27, 2015 for U.S. Appl. No. 12/945,883, filed Nov. 14, 2010.

Non-final Office Action dated Jul. 23, 2019 for U.S. Appl. No. 15/925,710, filed Mar. 19, 2018.

International Search Report and Written Opinion dated Jul. 11, 2019 for International Application No. PCT/IB2019/000272, filed Mar. 19, 2019.

Disa Press Release, New Point-of-Sale Activation Technology by Disa Digital Safety USA is Awarded First Place at the 2017 (R)Tech Asset Protection: Innovation Awards by the Retail Industry Leaders Association ("RILA"), Updated: Apr. 24, 2017, 4 pages.

\* cited by examiner

| | |
|---|---|
| WAREHOUSE/ STORAGE 1824 | RETAIL SMART SHELF 1826 |
| SERVER AND DATABASES 1822 | |
| | POINT-OF-SALE SCANNING AND PAYMENT 1832 |
| ANTITHEFT GATE/ MECHANISM 1828 | AUTO CHECK OUT 1834 |

Fig. 18

SECURITY SYSTEMS AND METHODS FOR ELECTRONIC DEVICES

CROSS-REFERENCE TO RELATED APPLICATIONS

This application continuation-in-part of and claims the benefit of U.S. Utility patent application Ser. No. 15/925,710 filed Mar. 19, 2018, and claims priority to U.S. Provisional Patent Application No. 62/683,530, filed on Jun. 11, 2018, each of which is hereby incorporated herein by reference in the respective entirety of each.

Technical Field

The disclosed technology relates generally to token security, and more particularly, some embodiments relate to systems and methods for administering security for various tokens.

Description of the Related Art

The use of gift cards and similar tokens has become an integral part of our lifestyles especially in the age of ecommerce. In the context of this document tokens may include any form of automatic teller machine (ATM) cards, credit cards, prepaid gift cards, loyalty and rewards cards and the like.

Presently these cards are sold in retail outlets with the token number exposed but it is not activated until it has been paid at the point of sale (POS). Although the current methods of activation provide a certain level of theft prevention and deterrence, these methods are not foolproof. Thieves are becoming more resourceful and have developed several techniques to circumvent the current security methods.

A predominant shortcoming of the current method involves scammers and thieves staking out a retail outlet and stealing the gift cards. They then scratch off the concealing foil to expose the card number and PIN number. After they obtain the card number and its corresponding PIN number, they re-conceal the card number and PIN number with a new security foil and replace the stolen cards on the hooks or shelves at the retail point of sale.

When an unsuspecting consumer buys a compromised gift card and pays for it the point of sale, the cashier scans and activates the card. The activation is thru the point-of-sale terminal which notifies the card issuer that payment has been made for a particular card. The card issuer activates the card in their server and it may now be used.

With the card now activated, the scammers or thieves make online purchases with the gift card number using the PIN they obtained, and clean out all the stored value in the card before the legitimate consumer can make his or her purchase.

SUMMARY

A process for providing security to a token, the process including: a digital security system generating a unique token identification code for each token to be locked; the digital security system storing in a security system database each token identification code; for a token being purchased, a point-of-sale system obtaining the unique token identification code from the token being purchased; the point-of-sale system sending the unique token identification code obtained from the token being purchased to the digital security system for activation of the token being purchased; the digital security system receiving the unique token identification code sent from the point-of-sale system and comparing the received unique token identification code with token identification codes in the security system database to authenticate the unique token identification code; and the digital security system activating the unique token identification code.

In various applications, the unique token identification code for a given token to be secured comprises a numeric, alphanumeric or ASCII string that uniquely identifies its corresponding token. In various applications, the unique token identification code for a given token is inscribed upon or otherwise affixed to its corresponding token in a human-readable form.

In various applications, the unique token identification code is read by an operator at the point-of-sale and manually entered into the point-of-sale system so that it can be transmitted to the digital security system to activate the corresponding token. In various applications, the unique token identification code for a given token is inscribed upon or otherwise affixed to its corresponding token in a machine-readable form. In various applications, the point-of-sale system validates payment for the procured token before sending the unique token identification scan code corresponding to that token to the digital security system for activation.

In various applications, the process further includes the security system verifying that the token corresponding to the received unique token identification code has not been previously activated prior to activating that token. In various applications, the process further includes the security system sending an activation message to the point-of-sale terminal to confirm that the token being purchased has been activated.

In various applications, the process further includes the security system sending a message to the point-of-sale terminal indicating that the token being purchased has been declined. In various applications, the process further includes creating a unique product identification code for each token to be secured, wherein the unique product identification code for its corresponding token comprises the unique token identification code for that corresponding token. In various applications, the unique product identification code comprises information in addition to the unique token identification code for that corresponding token.

In various applications, the process further includes the security system using the unique token identification code to determine a token number for the token being purchased and sending the token number for the token being purchased to the point-of-sale terminal at which the token is being purchased. In various applications, the process further includes the point-of-sale terminal at which the token is being purchased printing a receipt for the token being purchased, wherein the point-of-sale terminal includes the token number for the token being purchased on the receipt.

A digital security system, may include: unique token identification code generator circuit configured to generate a unique token identification code for each token to be locked; a database configured to store unique token identification codes generated by the unique token identification code generator circuit; a communication circuit configured to receive from a point-of-sale system a unique token identification code for a token purchased at the point-of-sale system; a processor configured to activate the token purchased at the point of sale system; and the communication circuit configured to send to the point-of-sale system and activation message indicating that the purchased token is activated.

The system may further include the processor updating the database to indicate that the purchased token has been activated. The system may further include the processor checking a status of a token corresponding to a received unique token identification code to determine whether the token corresponding to the received unique token identification code has previously been activated.

The system may further include a point-of-sale system comprising a processor configured to obtain the unique token identification code from the token being purchased and to send the unique token identification code obtained from the token being purchased to the digital security system for activation of the token being purchased.

The unique token identification code for a given token to be secured may include a numeric, alphanumeric or ASCII string that uniquely identifies its corresponding token.

In various applications, the unique token identification code for a given token is inscribed upon or otherwise affixed to its corresponding token in a human-readable form. In various applications, the unique token identification code is read by an operator at the point-of-sale and manually entered into the point-of-sale system so that it can be transmitted to the digital security system to activate the corresponding token.

In various applications, the unique token identification code for a given token is inscribed upon or otherwise affixed to its corresponding token in a machine-readable form. In various applications, the processor for the point-of-sale system is further configured to validate payment for the procured token before sending the unique token identification scan code corresponding to that token to the digital security system for activation.

The system may further include the processor verifying that the token corresponding to the received unique token identification code has not been previously activated prior to activating that token.

The system may further include the processor using the unique token identification code to determine a token number for the token being purchased and sending the token number for the token being purchased to the point-of-sale terminal at which the token is being purchased.

In various applications, the point-of-sale terminal at which the token is being purchased may print a receipt for the token being purchased, wherein the point-of-sale terminal includes the token number for the token being purchased on the receipt.

A process for providing security to a token, the process may include: a digital security system generating a unique token identification code for each token to be locked, wherein the unique token identification code uniquely identifies its corresponding token but does not include a token number required to conduct transactions using the token; the digital security system storing in a security system database the unique token identification code and token number for each token; for a token being purchased, a point-of-sale system obtaining the unique token identification code from the token being purchased and sending the unique token identification code obtained from the token being purchased to the digital security system for activation of the token being purchased; the digital security system receiving the unique token identification code sent from the point-of-sale system, retrieving the token number corresponding to the token being purchased and sending the retrieved token number to the purchaser of the token being purchased.

In various applications, sending the retrieved token number to the purchaser of the token being purchased comprises sending the retrieved token number to the point-of-sale terminal at which the token is being purchased. The process may further include the point-of-sale terminal at which the token is being purchased printing the token number for the token being purchased on a customer receipt.

The process may further include the digital security system sending the retrieved token number to an issuer of the token being purchased to activate the token.

The point-of-sale system may include a retail check-out system such as a cash register or other checkout system, which may include a scanner (e.g., bar code or product code scanner), card reader, database and other like instrumentalities.

The point-of-sale system may include an app installed on the purchaser's device and wherein the point-of-sale system obtaining the unique token identification code from the token being purchased comprises the user scanning the unique token identification number with the device or entering the unique token identification number using a GUI on the device.

Sending the retrieved token number to the purchaser of the token being purchased may include sending the token number to the purchaser's device.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the accompanying figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 18 illustrates an example high-level architecture for a system to capitalize on the capabilities of an enhanced product tag in accordance with various embodiments.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for providing digital security for electronic devices of all kinds. More particularly, some embodiments use a combination of a unique product identifier and unique activation code for each protected product to ensure that the protected device is locked and can only be unlocked and used by an authorized purchaser of the device.

Figure 1:
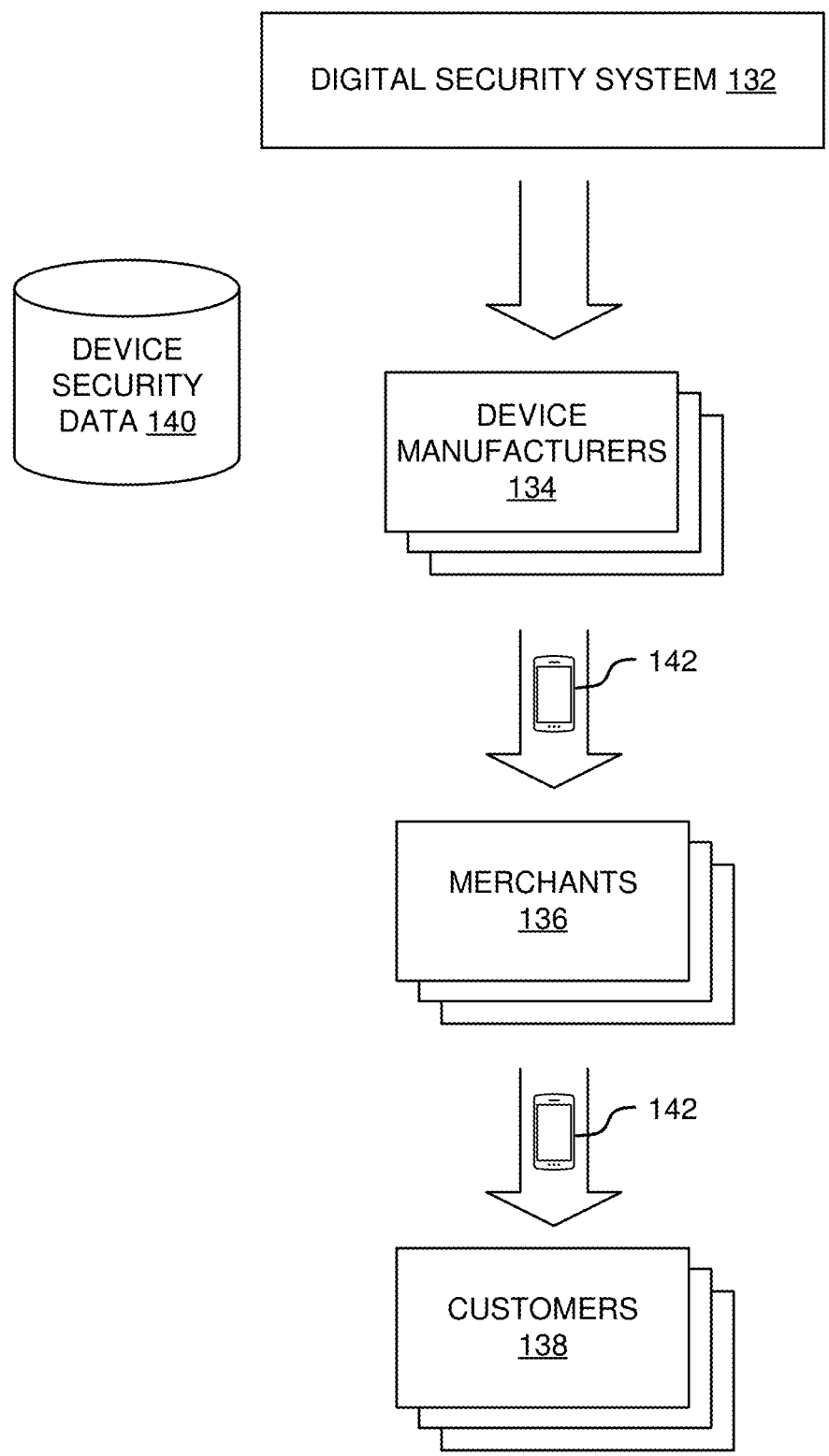
FIG. 1 is a diagram illustrating an example environment with which embodiments of the systems and methods described herein may be implemented.

FIG. 1 is a diagram illustrating an example environment with which embodiments of the systems and methods described herein may be implemented. This example illustrates a common distribution channel for electronic devices 142, which includes device manufacturers 134, device merchants 136, and customers 138. The example of FIG. 1 includes a digital security system 132 and an associated device security database 140 for storing device security data. Embodiments operating in this and other like environments are described below. However, in general terms, digital security system 132 includes circuitry to generate a unique product identification and random activation code for each device that is protected (i.e., a covered product). The digital security system may also create a unique product identification scan code (e.g., barcode, QR code, RFID tag, or other identification label) for each product. These unique identifiers and codes can be provided to the device manufacturers 134 to be included with the devices to be protected. The device manufacturers 134 may include a locking mechanism (e.g., an application or other locking circuitry) to lock the device electronically to prevent unauthorized use. The locked electronic devices 142 can then be provided to merchants 136 for ultimate resale to customers 138.

The various embodiments disclosed herein are described in terms of the parties and the example depicted in FIG. 1. However, the applicability of the disclosed technology is not limited to this example. In the example illustrated in FIG. 1, locked electronic devices 142 are illustrated as a smart phone. However, as one of ordinary skill will appreciate after reading this document, the devices that can be protected by the systems and methods described herein are not limited to smart phones or other like devices. Indeed, any of a number of different types of electronic devices may be protected using the technology disclosed in the various embodiments described herein. Likewise, the act applicability of the disclosed security techniques is not limited to merchants and end-user customers in the traditional sense. Instead, merchants 136 and customers 138 may be other parties who are taking part in a device transaction that would benefit from the locking and authorized unlocking techniques described herein. Nonetheless, to provide context and for clarity of description, the embodiments described in this where the document are described in terms of a direct-to-consumer seller as merchant 136 selling directly to an end-user purchaser as customer 138.

Figure 2:
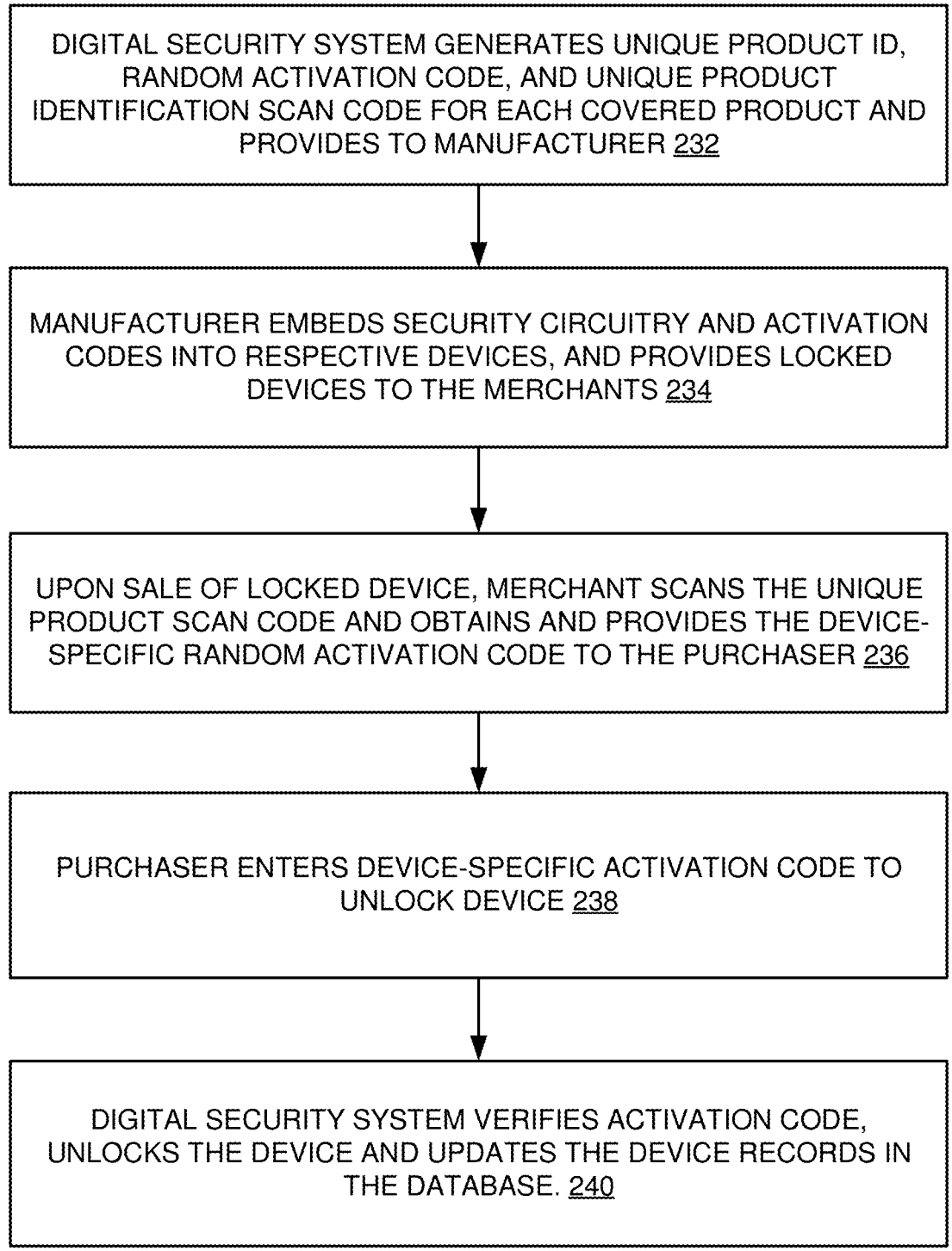
FIG. 2 is a diagram illustrating an example process for device security in accordance with one embodiment of the systems and methods described herein.

FIG. 2 is a diagram illustrating an example process for device security in accordance with one embodiment of the systems and methods described herein. With reference now to FIG. 2, at operation 232 the digital security system (e.g., digital security system 132) generates a unique product ID, a unique random activation code, and a unique product identification scan code for each device to be protected by the digital security measure. Because these security codes are unique to an individual device, they may each be identified in the database as corresponding to the devices with which each is assigned. The digital security system provides this information to device manufacturers (e.g., device manufacturers 134) to be used in manufacturing and preparing the devices for distribution. In some embodiments, the digital security system provides the activation codes as clear text activation codes. In other embodiments, the digital security system provides unlock codes (instead of or in addition to the activation codes) to the manufacturers in the form of a hash string.

At operation 234, the manufacturer embeds security circuitry into the devices to be protected, and loads the security codes onto the devices or the device server, or both. For example, in some embodiments the digital security system may provide the unlock codes to the manufacturers as a hash string created by applying a hash function to the activation codes. The manufacturer may then embed the resultant hash string in the device. The manufacturer may also embed a hashing algorithm inside the device and a hash string may be embedded in a device server (e.g., device security database 140). When the user keys in the activation code, the hashing algorithm is called to hash the activation code and validate the activation code (as described in more detail below). The manufacturer then distributes the locked devices to the merchant (e.g., merchants 136).

At operation 236, upon the sale of a locked device, the merchant scans the unique product scan code and obtains a device-specific random activation code corresponding to that device from the digital security system, and provides that activation code to the purchaser. The unique product scan code may contain product information such as conventional UPC information as well as the unique product ID generated by the digital security system. Accordingly, in some embodiments, scanning of the unique product scan code may be a single scan operation that captures important sales and product data regarding the product at the point of purchase. In other words, the merchant need not scan a UPC code and a unique product ID in 2 separate steps. With this sales and product data, the merchant retrieves and returns the activation code to the purchaser.

When the purchaser is ready to activate the locked device, the purchaser enters the provided device-specific activation code to unlock the device. This is illustrated at operation 238. The purchaser enters the activation code into the device which may be in clear text. The validation process may be done either within the device itself (e.g., in firmware or other device circuitry) offline with no internet access required or online using a device server. In either process, the hashing algorithm is called to hash the cleartext activation code to create an activation hash string and validate the result against the original hash string stored in the device or stored at the device server. This is illustrated at operation 238.

Upon receipt of the activation code, the device circuitry or device server verifies the code, unlocks the device if the hash of the inputted activation code matches the unlock code (e.g., original hash string embedded in device or stored in server) and updates the device records in the digital security system database. This is shown at operation 240.

Figure 3:
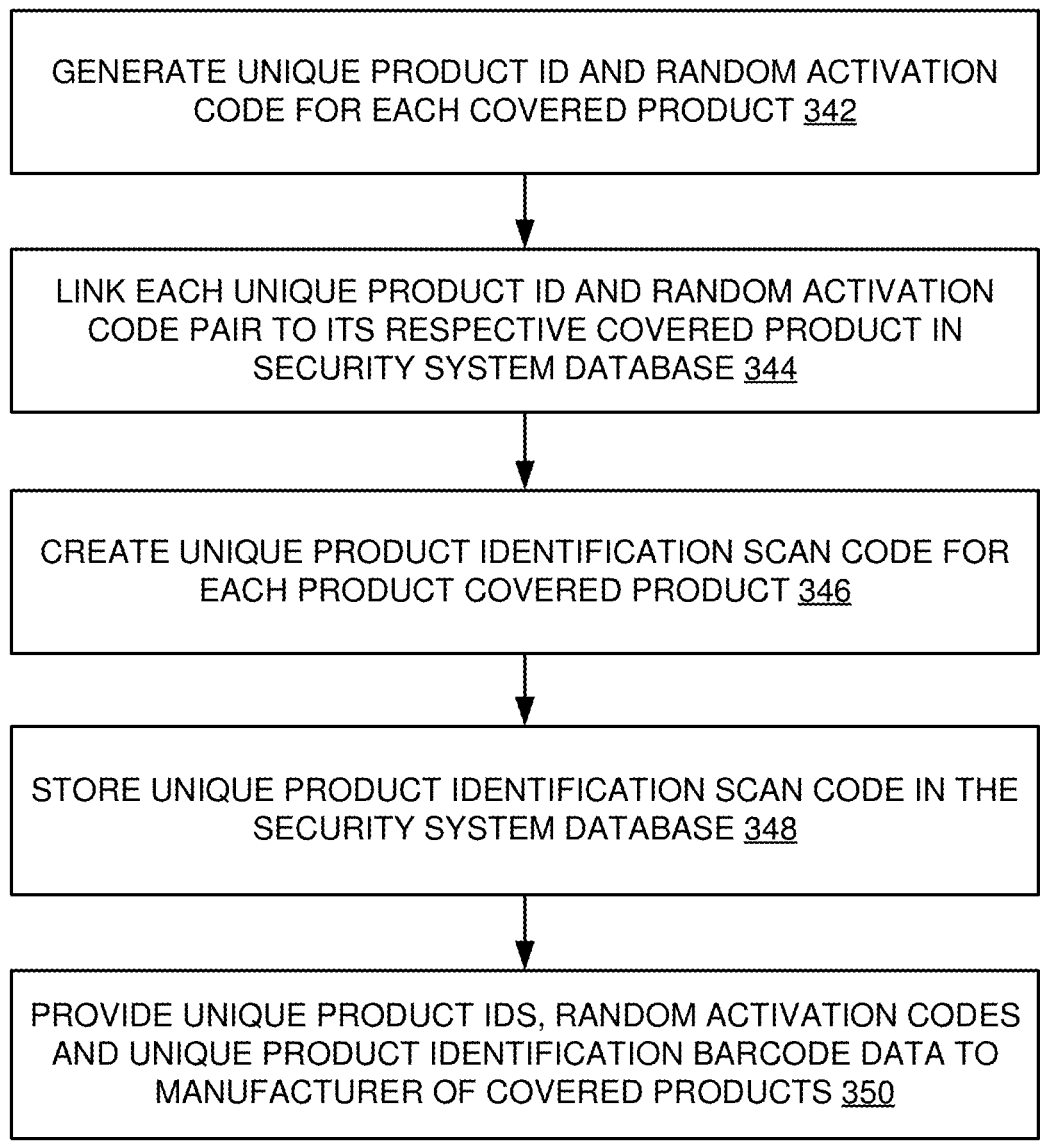
FIG. 3 illustrates an example process for a digital security system in accordance with one embodiment of the systems and methods described herein.

Having thus described a high level overview of systems and methods for device security, more specific example embodiments are now described with reference to an example digital security system (e.g. digital security system 132), device manufacturers (e.g., device manufacturers 134), merchants (e.g., merchants 136) and customers (e.g., customers 138). FIG. 3 illustrates an example process for a digital security system in accordance with one embodiment of the systems and methods described herein.

With reference now to FIG. 3, at operation 342 the digital security system generates a unique product identifier and a unique random activation code for each device to be locked in accordance with the operation of the security system. In some embodiments, the manufacturer provides device information such as, for example, model number, model name, product serial number and a UPC (Universal Product Code) for each product the manufacturer wants to be protected by the system. The unique product identifier uniquely identifies each individual product to be protected. In some embodiments, the unique product identifier can be analogized to a unique digital fingerprint for each device. Accordingly, through the use of the unique product identifier each product can now be uniquely identified. For example, product identification is not limited to a class of products (e.g., by model number), but each product within that class (or even across multiple classes) and have a unique identification number. Although in some embodiments the unique product identifier is unique for each product to be protected, in other embodiments, the unique product identifier may be reused, for example, over time, or for different product classes or product types.

The activation code may also be unique for each protected product, or for each product in a class of products. In some embodiments, the activation code may be a random activation code that is generated using a random-string generation process. In some embodiments, the random-string generation process can use the system-created unique product identifier, a product serial number, or other unique identifying information to generate the random activation code. In other embodiments, the activation code is not generated using a random-string generation process, but may be chosen specifically for each product, or as a non-random mathematical process. In various embodiments, the unique product identifier and activation codes may be a numeric, alphabet, alphanumeric, national characters, special characters, or other like character string or strings, or any combination of any of the foregoing.

At operation 344, the digital security system links each unique product ID and random activation code to its respective covered product in a security system database (e.g., device security database 140). As such, the digital security system can retrieve, when needed, the unique product identifier, the random activation code, or both corresponding to (e.g., assigned to, created for, etc.) a given product upon request.

At operation 346, the digital security system creates a unique product identification scan code for each product to be protected. The scan code can be a combination of the UPC for the product and the unique product identifier. Accordingly, in various embodiments, the scan code can be used to not only identify a product type or model (e.g., the conventional UPC identification), but also to identify each product uniquely. The scan code can be implemented as, for example, a barcode, QR code, RFID tag, or other like scannable code. Preferably, the scan code is a machine readable code that can uniquely identify the product upon querying by optical, electrical, RF, or other electromagnetic means. The unique product identification scan code can be created by concatenating the UPC of the product with the unique product identifier for that product. This can be a simple concatenation (e.g., one after the other), and interleaving of symbols, or other concatenation. In further embodiments, unique product identification scan code can be created by combining the product UPC with the unique product identifier for that product using a mathematical relationship.

At operation 348 the scan code (or a numeric, Alpha, alphanumeric, etc. representation of the scan code) may also be stored in a security system database and linked to its respective corresponding product. The scan code in some embodiments includes product and sales data of the device which can be captured or retrieved at the point of sale using one single-scan operation.

At operation 350, the generated product information can be provided to the manufacturer of the devices to be protected. For example, the digital security system can provide to the manufacturer the unique product identification, random activation code and unique product scan code for each product to be protected, along with an identification of each product to which these unique codes correspond. Accordingly, as a result of the foregoing or other like operations, the digital security system has created security data that includes a unique product ID, a unique activation code and a unique product scan code for each product to be protected, and has linked these items in a database so that they can later be used for authentication and device unlocking. Examples of device authentication and unlocking steps are described in further detail below.

Figure 4:
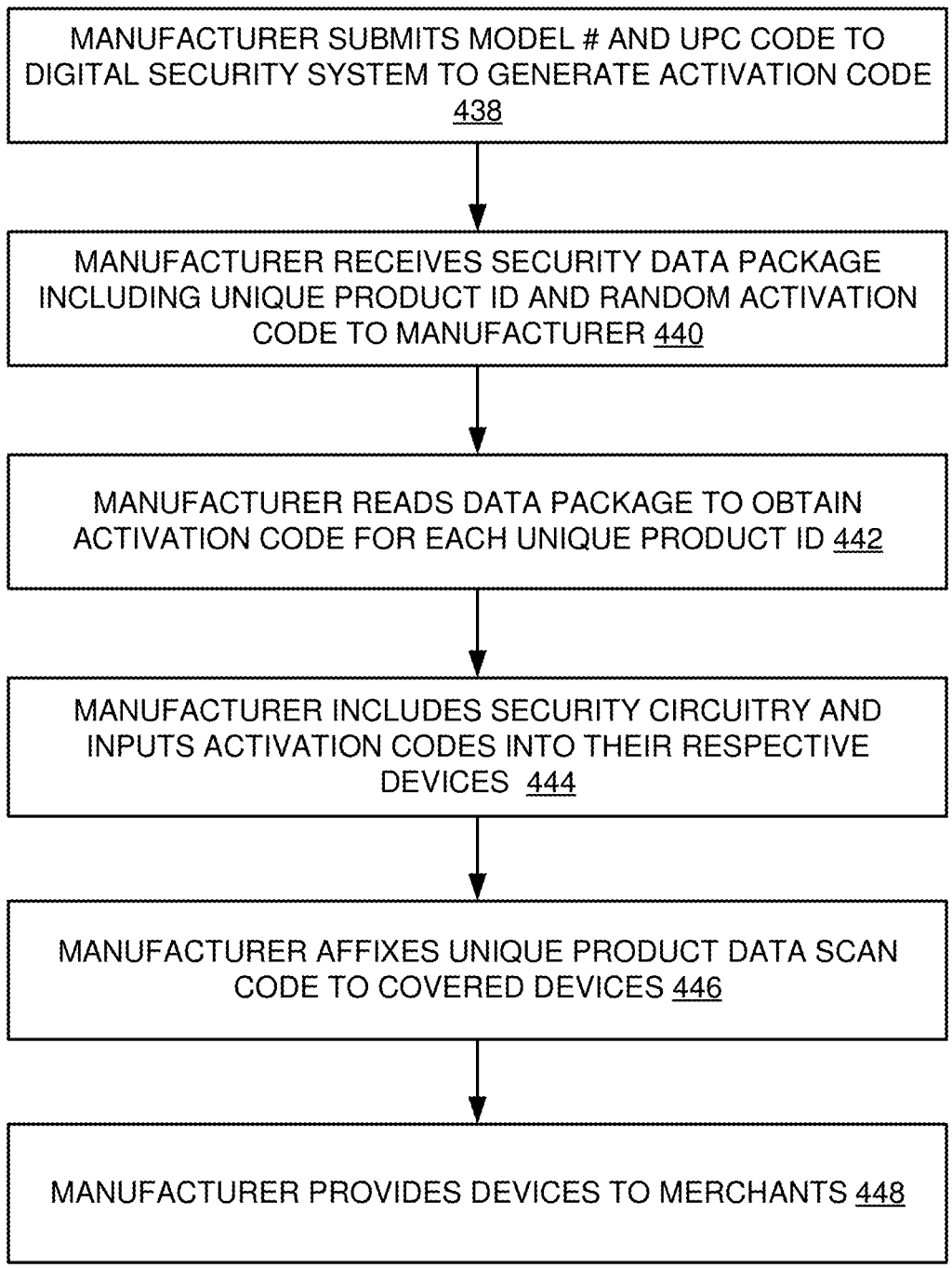
FIG. 4 is a diagram illustrating an example process used by a manufacturer for device security in accordance with one embodiment of the systems and methods described herein.

FIG. 4 is a diagram illustrating an example process used by a manufacturer for device security in accordance with one embodiment of the systems and methods described herein. Referring now to FIG. 4, in this example at operation 438 the manufacturer of a group of products to be secured (e.g., one of the device manufacturers 134) submits product information about the products it wishes to protect to the digital security system. This product information can include, for example, model # and a UPC code. As described above, the digital security system may use the model number or UPC code to generate a unique scan code for each product and a unique activation code that corresponds with the unique scan code such that the activation code can be used to unlock the device that belongs to the unique scan code.

At operation 440, the manufacturer receives the security data package from the digital security system. As described above, this can include the unique product identification scan code its corresponding unique activation code for each individual product to be protected. In various embodiments, the digital security system can also provide the unique product identifier to the manufacturer as well. In some embodiments, the data package can be transmitted to the manufacturer via the digital security system (e.g., through a secure communication link) emailed to the manufacturer, communicated via telephone, or otherwise transmitted to the manufacturer. In other embodiments, the manufacturer can be provided access to the device security database (e.g., device security database 140) so that the manufacturer can access the data package for its products. One way to do this is by web access, although other access mechanisms may be provided. The data package can be password-protected or otherwise protected from unauthorized access via appropriate security measures. At operation 442, the manufacturer reads the data package. In some embodiments, the data package can be a zipped or otherwise coded file such as, for example, a zipped CSV file, that includes activation codes and unique product ID scan codes for group of devices to be manufactured by the manufacturer.

At operation 444, the manufacturer manufactures the product and includes the appropriate security circuitry with the product. In some applications, for example, security circuitry can include a FPGA, ASIC, firmware or other circuitry to lock the device pending receipt of an appropriate activation code. In other embodiments, the locking mechanism might not include circuitry but can be, for example, a unique product identification code such as a unique token identification code as described with reference to FIGS. 15-17.

For each device, the manufacturer may parse the data package file to retrieve the appropriate product identification scan code and activation code for each product being manufactured. The manufacturer can ensure that the product is locked using the lock circuitry. In some embodiments, the activation code is provided to the manufacturer by the digital security system as a hash string created by hashing the activation code according to a hash function. In other embodiments, the activation codes are provided to the manufacturer by the digital security system and the manufacturer performs a hash function on the activation code to create a hash string. Accordingly the activation code can be stored as a hash value in the device such as, for example, in firmware or in memory in the security circuitry. The hash value can be hard coded into the lock circuitry, burned into memory (e.g., ROM) or otherwise stored on the device. It can also be stored in a device server database for later recall by authorized users (e.g., by the manufacturer). An example hash function is described below.

The manufacturer affixes the appropriate unique product identification scan code to each product to be protected. In some embodiments, the scan codes can be etched directly onto the product packaging or otherwise affixed so as to prevent tampering with the label. This is illustrated at operation 446. At operation 448, the manufacturer provides the locked devices to merchants (e.g., merchants 136).

Figure 5:
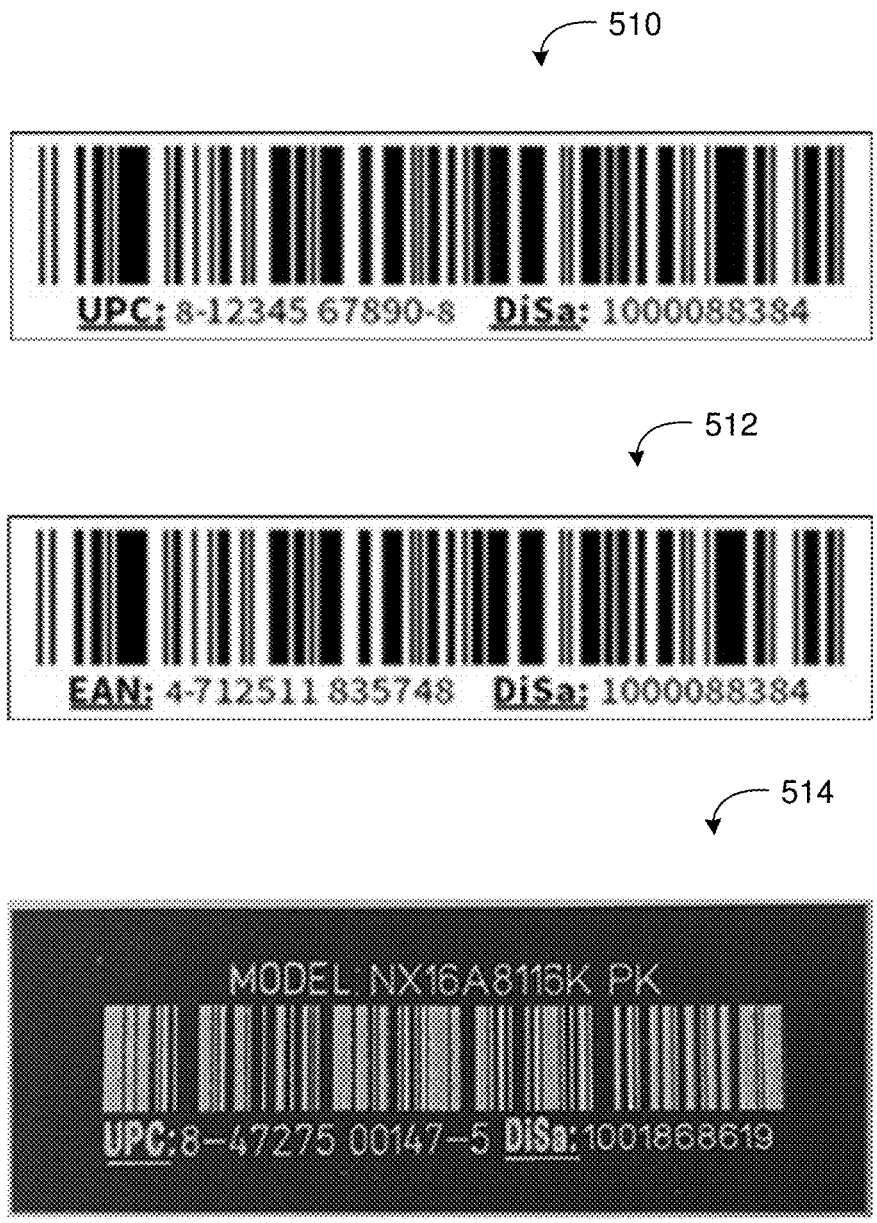
FIG. 5 illustrates an example of unique product scan codes in accordance with one embodiment of the systems and methods described herein.

FIG. 5 illustrates an example of unique product scan codes in accordance with one embodiment of the systems and methods described herein. This figure includes 3 example scan codes 510, 512, 514. In this example, each scan code is a combination of a UPC code for the product and the unique product ID (labeled DiSa in the examples) created for the particular product. In this example, the unique scan code is a concatenation of the UPC with the unique product identification determined by the digital security system. In other embodiments, other techniques can be used to arrive at a unique code to be embodied in the unique product scan code.

Figure 6:
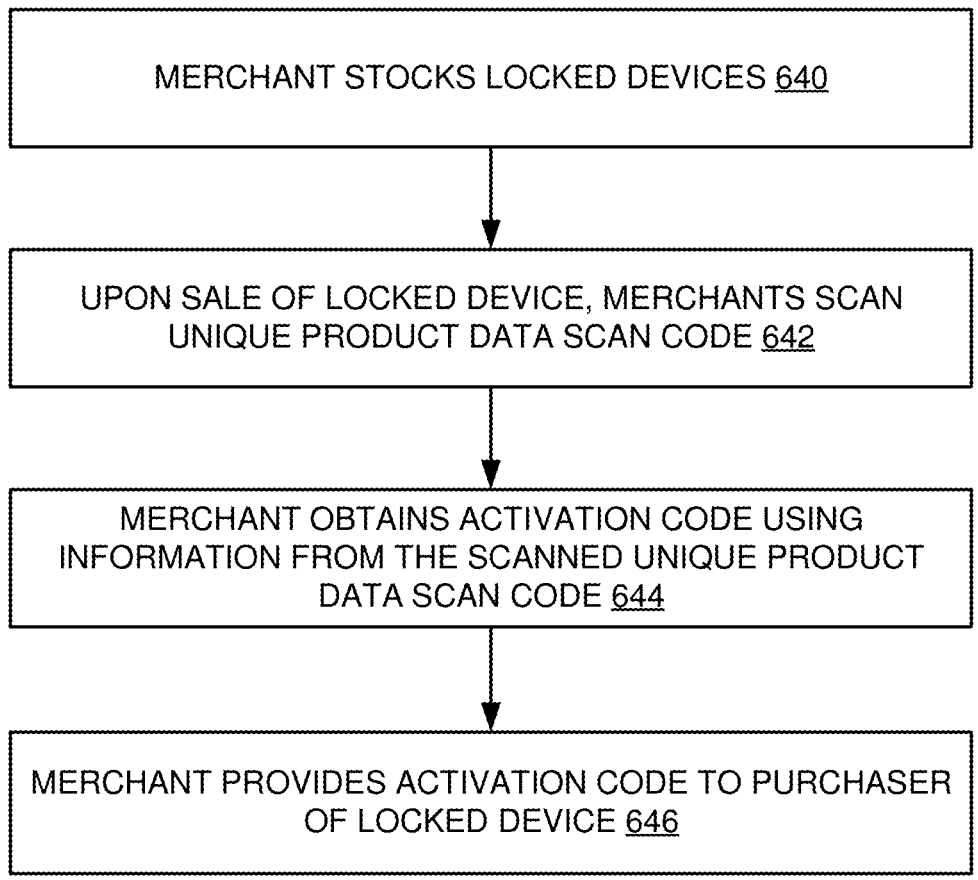
FIG. 6 is a diagram illustrating an example process performed by a merchant in accordance with one embodiment of the systems and methods described herein.

FIG. 6 is a diagram illustrating an example process performed by a merchant in accordance with one embodiment of the systems and methods described herein. With reference to FIG. 6, at operation 640, the merchant receives locked devices from the manufacturer, the devices can be received directly from the manufacturer or indirectly such as, for example, through a variety of sourcing or distribution channels. The merchant may stock the protected devices and make them available for retail sale to customers (e.g., customers 138).

At operation 642, when the merchant sells a locked device to a customer, the merchant may scan the unique product scan code. Because in various embodiments the unique product scan code includes both the UPC and the unique product identifier, applications may be implemented in which only a single scan is required to both check-out the device at the POS system (i.e., scan the UPC barcode for the purchase transaction) and to obtain the appropriate activation codes for the customer based on the unique product identification code that may also be obtained by scanning the scan code. In other words, the unique product scan code may include sufficient information to allow the product-sale transaction to take place, and retrieve the activation codes with a single scan.

Providing an implementation with a combined unique product scan code that allows a single scan operation to be performed, the cashier (or other merchant personnel) can capture both UPC (or like) product data and the unique product identifier (for digital security purposes) without having to search for and scan multiple barcode labels. Thus, a single and efficient scan operation can allow the retail system to capture product data to enable the sale transaction to take place, update inventory, etc., and allow the system to obtain the correct activation code because the unique product ID uniquely identifies the specific device being sold. In various applications, the single scan can also be used to update inventory, perform sales analytics, and enable the functionality of the device security as described herein. This can prevent the theft of electronic devices and return fraud.

Accordingly, at operation 644, the merchant obtains the activation code using information obtained by scanning the unique product data scan code. In one embodiment, the merchant may access the security database to obtain the activation code. This can be done, for example, by the merchant accessing the digital security system database or accessing a database of the manufacturer that includes the same information. In either case, the database access may be provided as a secure access with password or other like access protections as well as data encryption.

At operation 646, the merchant provides the obtained activation code for that device to the purchaser. For example, in some embodiments, the activation code may be printed on the customer's receipt, emailed to the customer, texted to the customer, or otherwise provided to the customer. In some applications, the process may be automatic such that the POS recognizes the unique product scan code retrieves the activation code and provides it to the user (e.g. through one or more of the aforementioned methods).

Figure 7:
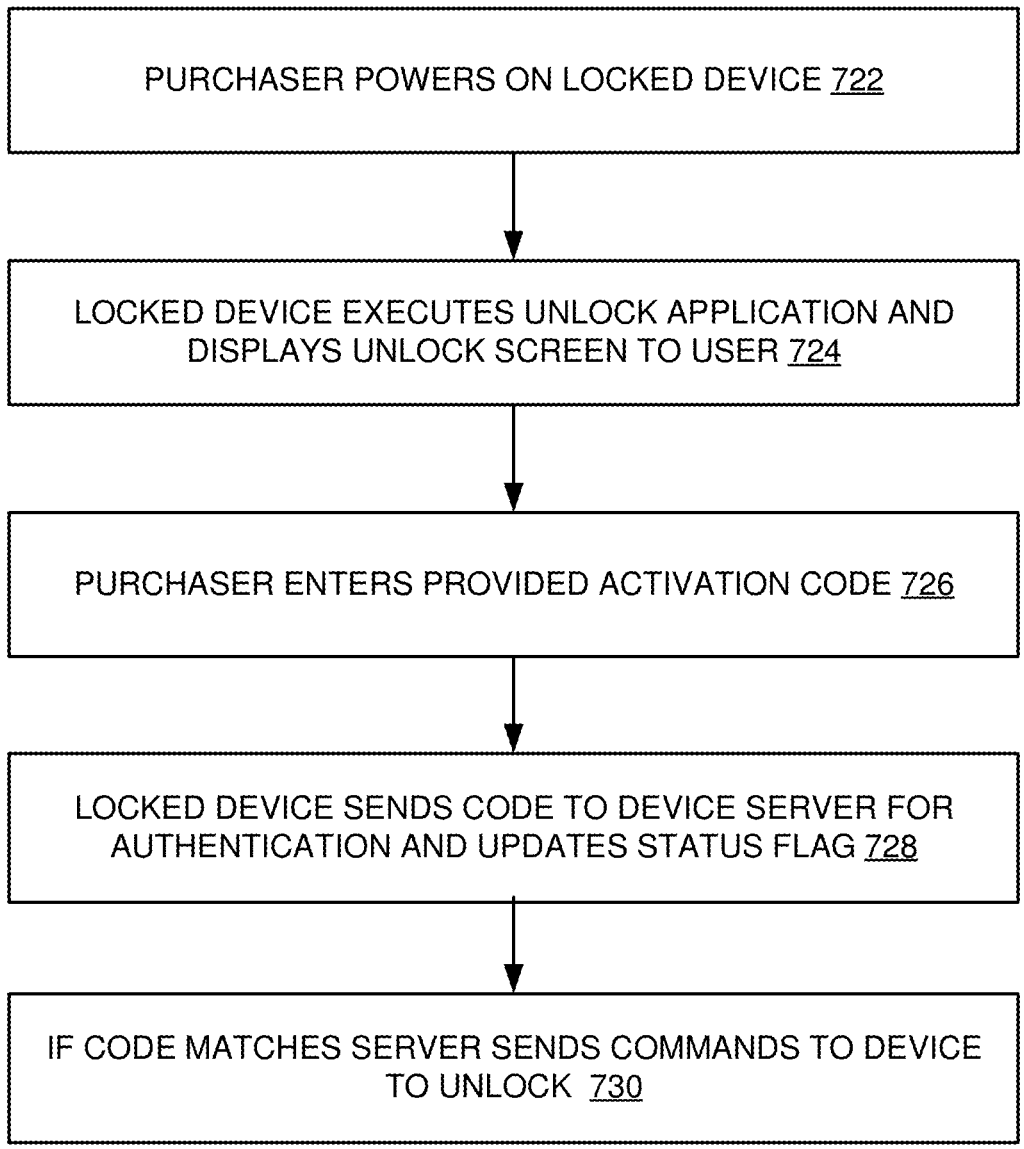
FIG. 7 is a diagram illustrating an example process performed by a purchaser of a locked device in accordance with one embodiment of the systems and methods described herein.

FIG. 7 is a diagram illustrating an example process performed by a purchaser of a locked device in accordance with one embodiment of the systems and methods described herein. Referring now to FIG. 7, at operation 720 the purchaser powers on the locked device. At operation 724, locked device initiates the unlock process. For example, in one embodiment, the device initiates the lock circuit to begin unlock operations. Where the lock circuit includes an unlock application, the application is executed. In devices equipped with a display screen (e.g., GUI or other display), one or more unlock displays may be displayed to the user via the display screen or other display apparatus so that the user can interact with the device (e.g., input and activation code) for the unlock operation.

Figure 8:
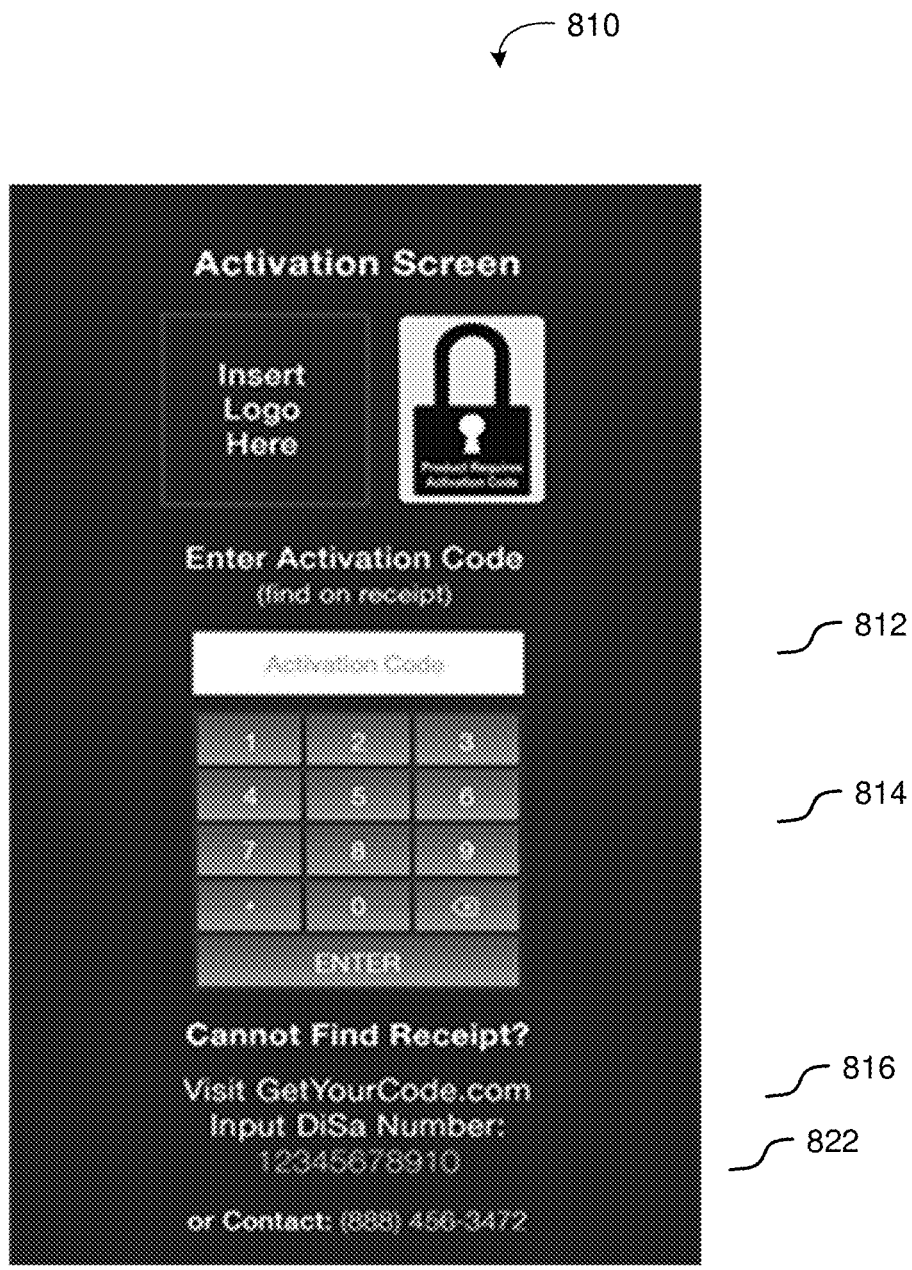
FIG. 8 is a diagram illustrating an example activation screen that may be displayed to a user as part of an unlock operation in accordance with one embodiment of the systems and methods described herein.

FIG. 8 is a diagram illustrating an example activation screen that may be displayed to a user as part of an unlock operation in accordance with one embodiment of the systems and methods described herein. In this example, activation screen 810 includes a data entry field 812 in which to enter the activation code and a keypad 814 to allow the user to enter the code. In this example, keypad is a numeric keypad for the entry of a purely numeric code. In other examples, keypad may be alphanumeric or include other characters such that the activation code is not a purely numeric code. This example also includes contact information 816 to provide information to the user to obtain the appropriate device activation code through other methods in the event that she or he lost her or his receipt. This example includes the unique product identification number 822 to assist the user in obtaining the activation code. In various embodiments, if the user visits a website or uses the telephone or email contact, the user may be required to provide proof of purchase to obtain the activation code.

Returning now to FIG. 7, at operation 726 purchaser enters the activation code. For example, the activation code can be entered into the device using the keypad 814 on activation screen 810. In embodiments that do not include a user display, other techniques for device unlocking may be provided. For example, various devices may be equipped with Bluetooth, Wi-Fi, or other means of access through which the purchaser may enter his or her activation code. As a further example, the user may sync his or her smart phone, tablet, or other smart device to the locked device and the unlock screen can be displayed on the synced smart device. As yet another example, the locked device may be connectable to the Internet (e.g., Wi-Fi, ethernet, etc.) and the purchaser may be able to log on to a website on the Internet to provide her or his activation code.

At operation 728, the locked device provides the activation code to the device's unlock circuitry (e.g. digital security circuit 1016 at FIG. 10) or sends it to the digital security system for authentication. At operation 730, the device's lock circuit or the digital security system checks the code for a match. This can be done, for example, by applying the same hash function to the activation code and verifying that the resultant hash string matches the stored hash string (in the device or at the device server). If the activation code is verified, the device can be unlocked. Where the device's unlock circuitry is used to verify the activation code, the unlock circuitry can now unlock the device and enable access by the user. If verification was performed by the digital security system, the digital security system may send commands to the device to unlock the device. The digital security system may update the device status as "sold" to identify that the device has been sold and unlocked.

As noted above, in one embodiment, a hash function or other like technique can be used to create a locking code for the device. In one embodiment, a B-crypt hash value is created by encoding the activation code into a 184 bit fingerprint using the B-crypt algorithm. The B-crypt hash function does not perform encryption, but it hash is based on the blowfish cipher which provides the benefit of being brute-force resistant. The same hash function can be used by the device's unlock circuitry or the digital security system to verify the authentication code. When the activation code is received by the device's lock circuit, for example, the lock circuit performs the hash function and checks the resultant hash string against that stored in the device for a match. If there is a match, the lock circuitry unlocks the device, and may also display a message to the user regarding the unlocked status of the device. In embodiments where the activation code is sent to the digital security system for verification, the digital security system performs the hash function and checks the result against the originally stored hash string to see if they match. If there is a match, the digital security system sends a command set to the device to unlock the device. It can update the database to mark the device as sold.

Figure 9:
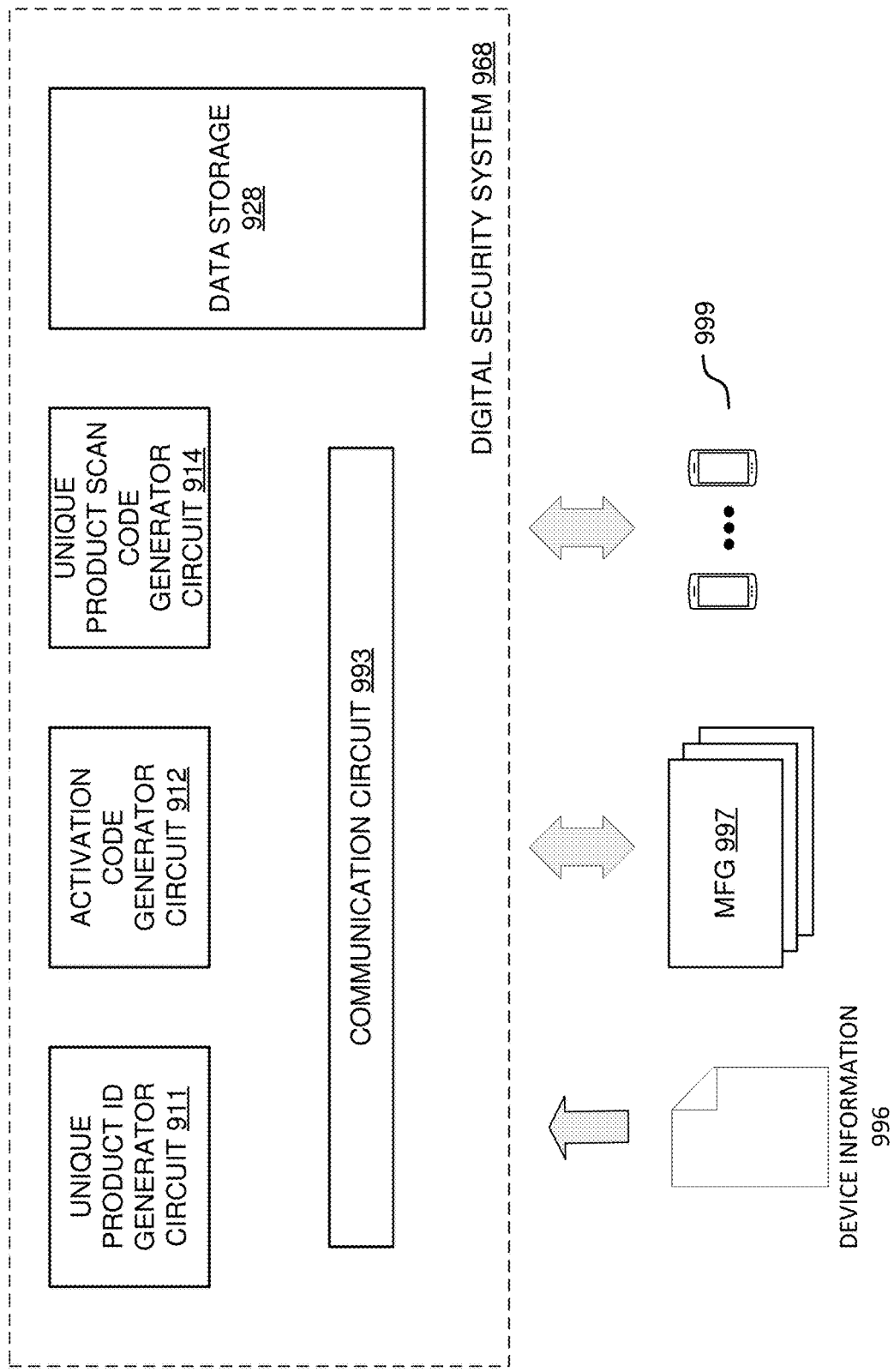
FIG. 9 is a diagram illustrating an example of a digital security system in accordance with one embodiment of the systems and methods described herein.

FIG. 9 is a diagram illustrating an example of a digital security system in accordance with one embodiment of the systems and methods described herein. This example digital security system 968 includes a unique product ID generator circuit 911, and activation code generator circuit 912, unique product scan code generator circuit 914, data storage 928 and communication circuit 993. The various circuits may be implemented using ASICs, FPGAs, processors, firmware, software or other instrumentalities.

In operation, the digital security system receives information from device manufacturers 997 (e.g., manufacturers 134), which can include, for example, device information, UPC information for devices, and so on. Digital security system 968 may receive device information 996 from other sources as well. For authentication purposes, digital security system 968 may receive information such as, for example, authentication codes, from devices 999. Unique product ID generator circuit 911 uses the received device information to create unique product ID for each device on the manufacturers list. In some embodiments, generator circuit 911 sequentially assigns a string of numbers to each product. In another embodiment, generator circuit 911 puts together a coded string of numbers based on the product information. In yet another embodiment, a random but unique number is assigned. Activation code generator circuit 912 creates a unique activation code for each device. In some embodiments, this is created using a random number generator that generates a random number unique to each device. In some embodiments, the activation code is a string of numbers. In other embodiments, the activation code is a string of alpha, alphanumeric, numeric, special, or other characters, or a combination of the foregoing. Unique product scan code generator circuit 914 creates the unique product scan code for each product. As described above, this can include a code that combines UPC information with the unique product ID.

Data storage 928 can be used to store the unique product IDs, activation codes, and product scan codes for each product. These created codes can be linked to their respective products in data storage 928. Communication circuit 993 can include wireless or wired communication interfaces, including wired or wireless transmitters and receivers, to receive information from and transmit information to third parties such as, for example, manufacturers, merchants, customers, and so on. For example, communication circuit 993 can include a web-based interface for communications.

Figure 10:
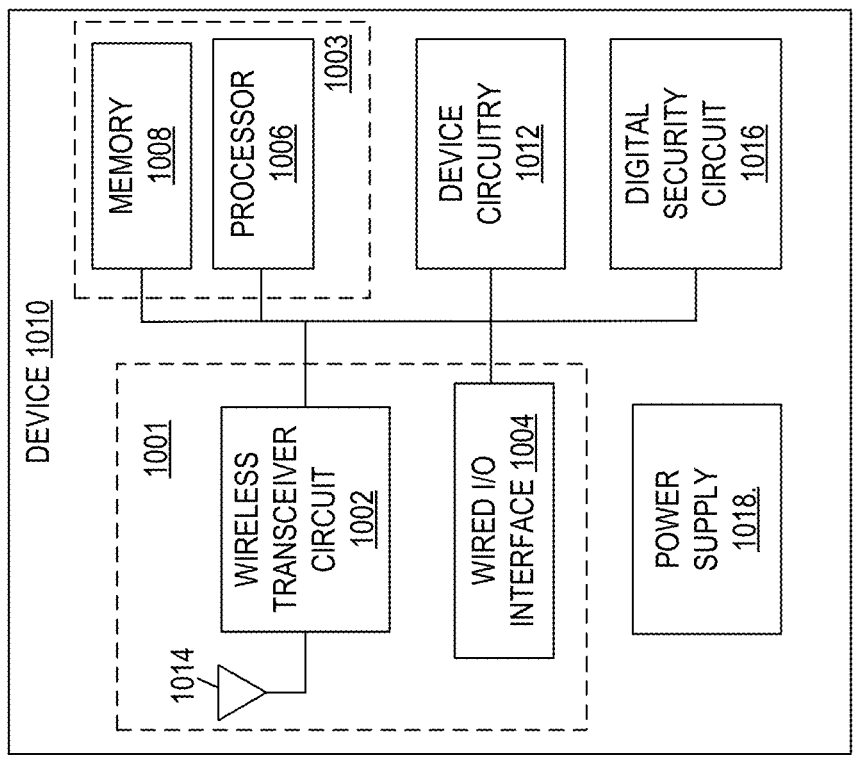
FIG. 10 is a diagram illustrating an example of a device that can be protected using the systems and methods disclosed herein.

FIG. 10 is a diagram illustrating an example of a device that can be protected using the systems and methods disclosed herein. This example device 1010 is an electronic device that includes device circuitry 1012 to perform device functions. For example, in the case of a digital camera, device circuitry 1012 may control camera operations, image capture, processing and storage, and so on. In some applications, this may be done in conjunction with processing circuit 1003. In other applications, device circuitry 1012 may likewise perform functions to control the operations of that device. This example also includes a processing circuit 1003 that includes processor 1006 and memory 1008, and a communication circuit 1001 that includes a wireless transceiver circuit 1002, a wired communication interface 1004 and an antenna 1014.

Digital security circuit 1016 can be included by the device manufacturer to perform the locking and unlocking functions in accordance with systems and methods described herein. Digital security circuit 1016 can include circuits to lock the device, present an unlock screen to the customer and manage the verification process through communication circuit 1001. As noted above, in some embodiments, digital security circuit 1016 presents an unlock screen to the user via a GUI or other display on device 1010 (not illustrated in this example). In other embodiments, digital security circuit 1016 may coordinate the unlocking operation with the customer via communication circuit 1001. An example of this is described above in which the customer interfaces with device 1010 via her or his smart phone, tablet, or other instrument. Another example of this is described above in which the customer interfaces with device 1010 via a web interface.

Processing circuit 1003, which includes processor 1006 and memory 1008 can be used to support digital security circuit 1016 device circuitry 1012 communication circuit 1001 and other device functions. Power supply 1018 can be included to provide power to the device circuits. Power supply 1018 can include, for example, a battery or other chemical energy storage device, capacitive storage units, renewable power sources (e.g. photovoltaic cells), and so on.

Figure 11:
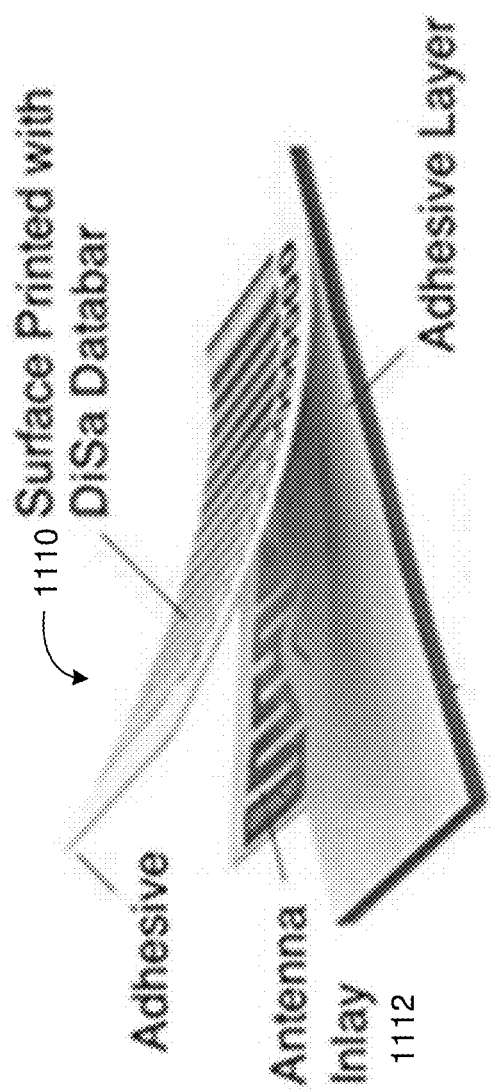
FIG. 11 illustrates an example of a unique scan code integrated with a wireless unique product code to provide an enhanced product tag.

In various embodiments, unique scan codes (e.g., such as those described above with reference to FIG. 5), can be combined with a wireless implementation of the unique product IDs (e.g., such as those included with unique scan codes) to enable additional product tracking and management in addition to or as an alternative to the various features described above. FIG. 11 illustrates an example of a unique scan code integrated with a wireless unique product code to provide an enhanced product tag. In the illustrated example, the unique scan code 1110 includes an optical scan code such as, for example, the scan codes 510, 512, 514 illustrated and described above with reference to at least FIG. 5. Accordingly, unique scan code 1110 can include, for example, a unique product identifier uniquely identifying the instance of the product to which the scan code is attached, along with a UPC or other like code generally identifying the product. For example, the UPC code may identify the product by model number, while unique product identifiers may be used to uniquely identify each individual instance of product within a group of products of the same model number.

The illustrated example of the enhanced product tag also includes a wireless identification circuit 1112 (including an antenna) that, like the unique product identifier, can also uniquely identify the product to which the enhanced product tag is affixed. The wireless identification circuit 1112 can include, for example, an RFID tag or other like wireless identification tag. As a further example, wireless identification circuit 1112 can include a controlling chipset, device memory (e.g., ROM) and an antenna. Wireless identification circuit 1112 can have the same information embedded on it as the information coded in unique scan code 1110. For example, wireless identification circuit 1112 can include an RFID tag with the products' unique product IDs and UPC codes embedded therein. Accordingly, individual product inventory, tracking and control can be accomplished through RF readers independently of or in addition to an optical scan with an optical scanning device. This can provide enhanced functionality for tracking and security.

In various implementations, the enhanced product tag can be created, the information associated with it handled, and the enhanced product tag affixed to products in the same manner as described above with reference to FIGS. 1-10. Accordingly, the enhanced product tag can be created to uniquely identify a product and the products UPC information, and can be used to track purchases for the product and enable locking and unlocking of the product. In addition, because the enhanced product tag includes RF capabilities, additional product tracking features can be accomplished.

Likewise, because the enhanced product tag includes the ability to be read via RF readers were interrogators, the enhanced product tag can be affixed internally to a product or internally to its packaging to further enhance the security aspects. Affixing the enhanced product tag internally to the product or its packaging can make it more difficult for a customer to remove the code for shoplifting purposes or to swap codes with other products to try to overcome the security features of the system. Where the enhanced product tag is external to a product, this can serve as a theft deterrent. Where the enhanced product tag is included internally, the packaging can be labeled to note that the product is protected by an enhanced product tag, which can also serve as a theft deterrent.

Figure 12:
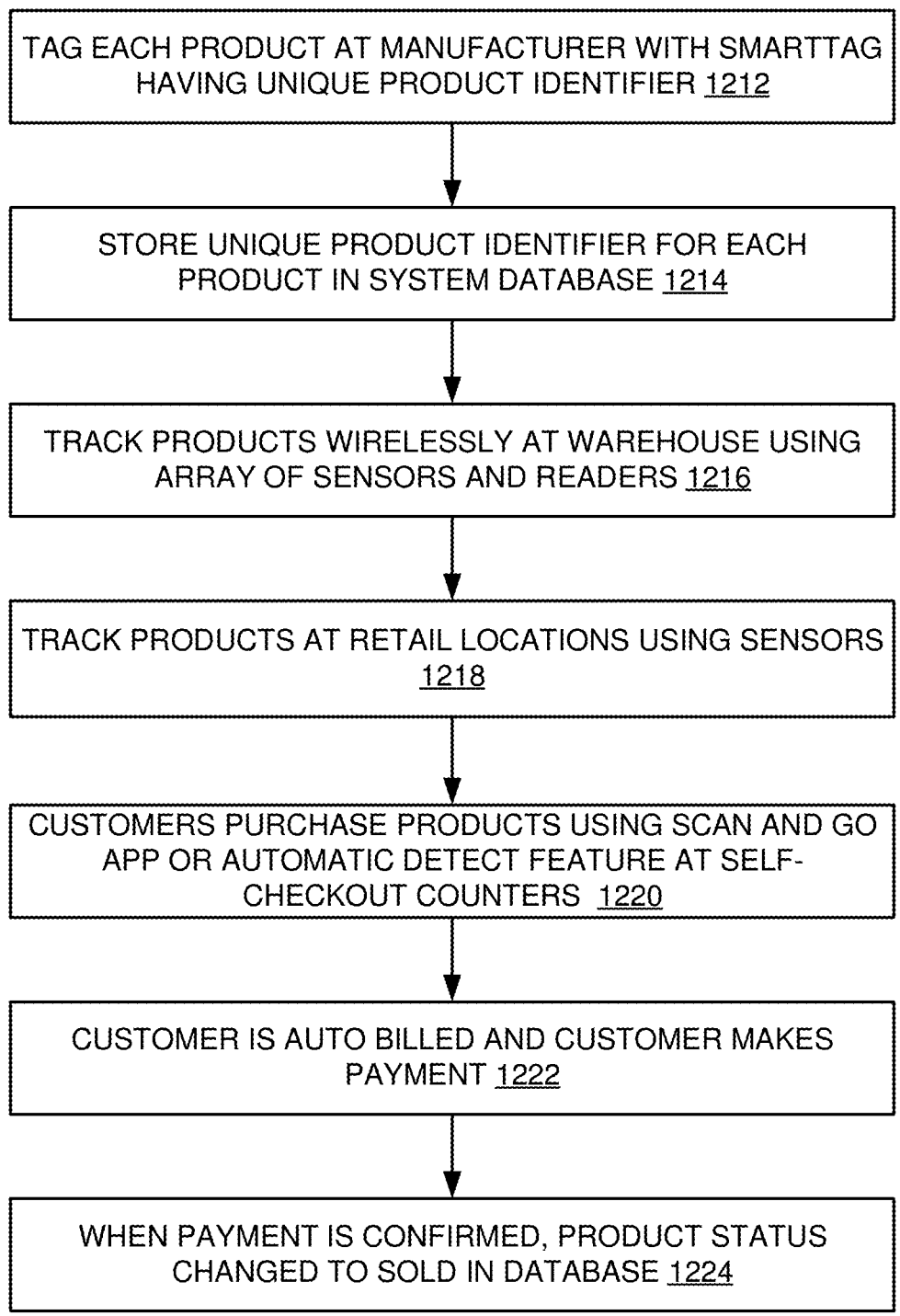
FIG. 12 is an operational flow diagram illustrating an example process for tracking products using an enhanced product tag in accordance with various embodiments.

FIG. 12 is an operational flow diagram illustrating an example process for tracking products using an enhanced product tag in accordance with various embodiments. With reference now to FIG. 12, at operation 1212, each product can be tagged at the manufacturer (or other location in the supply chain) with an enhanced product tag that includes a unique product identifier. As noted above, the enhanced product tag can also include an optical scan code in addition to an RF-readable code circuit. As also noted above, the enhanced product tag can include a UPC code in addition to a unique product identifier. In various applications, the enhanced product tag can be affixed to its corresponding product using an adhesive, mechanical fasteners, or using other techniques to secure the enhanced product code to the product. As also noted above, the enhanced product tag can be secured external to the packaging of the product, internally within the package, or internal to the product itself. For the enhanced product tag may include a barcode or other optical reader, securing the tag internally may be done in conjunction with a window to allow optical reading. However, where the enhanced product tag is affixed such that the packaging or product do not interfere with interrogating the tag using RF techniques, optical reading may not be required.

At operation 1214, the unique product identifier for each product is stored in the system database so they can be later recalled for tracking and other purposes. Because the enhanced product tag includes RF capabilities, products tagged with the enhanced product tags can be tracked wirelessly at the manufacturer warehouse, distribution warehouses, in shipping containers, at retail locations, and in other locations where inventory is maintained. This is illustrated at operations 1216 and 1218. Because the enhanced product tag includes RF interrogation capabilities, the products can be tracked using RF readers that can detect the information on the enhanced product tags. These RF interrogation devices can be included in fixed readers throughout the location, readers at checkout locations, readers included in handheld ones and product scanners, and so on.

In various applications, the RFID readers can be arranged as sensor arrays to read multiple locations within the facility. For example, RFID or other like readers can be used to interrogate enhance product codes affixed to products in these various locations. Information regarding product locations can be stored in the system database and can be used to track products from location to location within a building (e.g., as a product may be moved to a different shelf or to a different room, and so on) or from building to building.

Because the unique product identifier is included with the enhanced product tag, the enhanced product tag can be used to facilitate inventory and logistics management in the warehouse, in distribution centers, during shipment and at retail locations. As described in more detail below, sensors can be included at these various locations and can be tied to logistics or inventory management systems to use the enhanced product tag to track the location of specific, individual products, the sole status of these products, and so on. This inventory management can also provide alerts when inventory levels become low. Additionally, because the enhanced product tag can uniquely identify particular units of the products, the enhanced product identifier can be used to track things like expiration date, compliance with geographic restrictions for particular products, and so on.

At operation 1220, customers can purchase products tagged with the enhanced product tag using a variety of purchase options. In some implementations, a "scan and go" app such as on the customer's smart phone or other app-enabled device can be used to initiate and complete a purchase. In such implementations, the customer's device can include an RFID, NFC, or other like reader that can interrogate and read the enhanced product tag. Additionally or alternatively, the customer's device can use its camera or optical reader to scan the barcode, QR code or other optical code that comprises the unique scan code 1110.

In various embodiments, the customer's scan and go app can also include payment information to complete the transaction through the app without the need for a conventional checkout process through a checkout line. This can be accomplished through a debit transaction, credit transaction, money transfer transaction, or other transaction enabled or facilitated by the scan and go purchase app located on the client device, or another app associated with the scan and go app. The purchase and payment process can be automated or semiautomated such that when the customer selects a product for purchase, the financial transaction is concluded and the purchase is complete. This is illustrated at operation 1222.

Alternatively, as also illustrated at operation 1220, checkout counters, including self-checkout counters, can be enabled with RFID, NFC, or other like readers such that the item can be "rung up" through self-checkout counters or other like automatic detection checkout facilities. The customer can make payment at the self-checkout counters using any of a number of payment methodologies including, for example, payment through an app, payment through RFID or NFC payment tokens, conventional credit, debit or cash transactions through the checkout counters, and so on. Again, these various techniques can be accomplished through auto billing or other automatic payment processes such that the transaction is relatively quick and easy for the customer. In some implementations, this can make the buying process easier for the customer, reduce in-store lines for other customers, reduce the burden on staffing checkout counters and enhanced security of transactions.

In addition to the ability to provide quick and efficient payment using an app or auto checkout via RF interrogation, the enhanced product tag can also be implemented to reduce or prevent the occurrence of theft as discussed more fully below. Because tag products can be detected by RF interrogation sensors in various locations such as, for example, at the checkout counter, at store exits, outside the store or in the parking lot, and so on, the sensors can detect removal or attempted removal of products without proper payment. Accordingly, this can make it more difficult for a would be thief to hide products to avoid payment (e.g., such as on his or her person or in his or her pockets) or to pretend to scan a product. This can also prevent or reduce the occurrence of 'innocent' nonpayment such as, for example, by interrogating products that may be forgotten on the rack underneath the shopping cart. In some embodiments, where multiple sensors are used, the location of each product within the cart can also be provided at the time of checkout. This can be useful if, for example, the customer questions a product rung up on his or her account, or the customer seeks to remove a product from the cart that he or she has decided not to purchase after all.

At operation 1224, when the transaction is concluded and payment is verified, status of the unique product corresponding to the unique product identifier on the enhanced product tag can be updated in the system database. This can be updated at the manufacturer's database, as well as at databases associated with the retailer or associated point-of-sale operator. For purchases using the scan and go or other like app, the app can include communications to the server or other backend interface to update the system database (which as disclosed above, may include multiple databases) as soon as the transaction occurs.

In some implementations, the retailer can provide verification to the server to avoid a situation in which the app might provide false verification of purchase to the server. This can be accomplished, for example, by requiring an independent verification path from the retailer to the server, by only allowing transaction completion status to be provided by the retailer, or by configuring the app such that the transaction can't be confirmed and verified until the retailer has responded to the app indicating that the payment is complete. Such implementations may be configured to help minimize the risk that the client had might be hacked to provide false verification of the payment process.

Once the product status is marked as "sold" security sensors (e.g. security detectors or gates) can be updated to indicate that the unique product identifier or combined UPC/unique product identifier is associated with a product that has been properly purchased. Accordingly, the security sensors can be configured to not generate an alarm when the customer exits the premises with the product and can also be configured to update the database to indicate that the product has in fact left the premises. Because the database can be updated automatically upon verification of purchase, there is no need to reprogram the enhanced product tag circuit itself. Accordingly, embodiments can be implemented such that there is no need for a checkout cashier to take any steps to manually clear or remove the enhanced product tag, unlike Electronic Article Surveillance (EAS) or other similar tags that must be cleared or removed by a cashier upon purchase. In various implementations, the enhanced product tag might be used in conjunction with and EAS tag as an added layer of security.

In some implementations, the enhanced product tag can also be useful to provide added security during product return. In some applications, the enhanced product tag may be required to return the product to help prevent the occurrence of return fraud. It is also noted that with an RF-enabled enhanced product tag, the product code can be provided internal to the packaging or internal to the product such that it cannot be easily separated from the product and placed on a different product. This can provide additional security by making it more difficult for a user to return a product that was not purchased from the premises. Again, because the enhanced product tag can be interrogated using RF means, it need not be a fixed to the outside of the packaging.

In further embodiments, the unique product identifier can be tied to the product serial number to provide a further defense against an individual removing the enhanced product tag from one product and affixing it to another. In some embodiments, for example, the unique product identifier can be the serial number of the product itself, or a hash of the serial number, or other numeric or alphanumeric string mathematically derived from the product serial number. In this way, the unique product identifier of the tag accompanying a return product can be checked against the serial number of the product to verify that the tag corresponds to the product itself.

Figure 13:
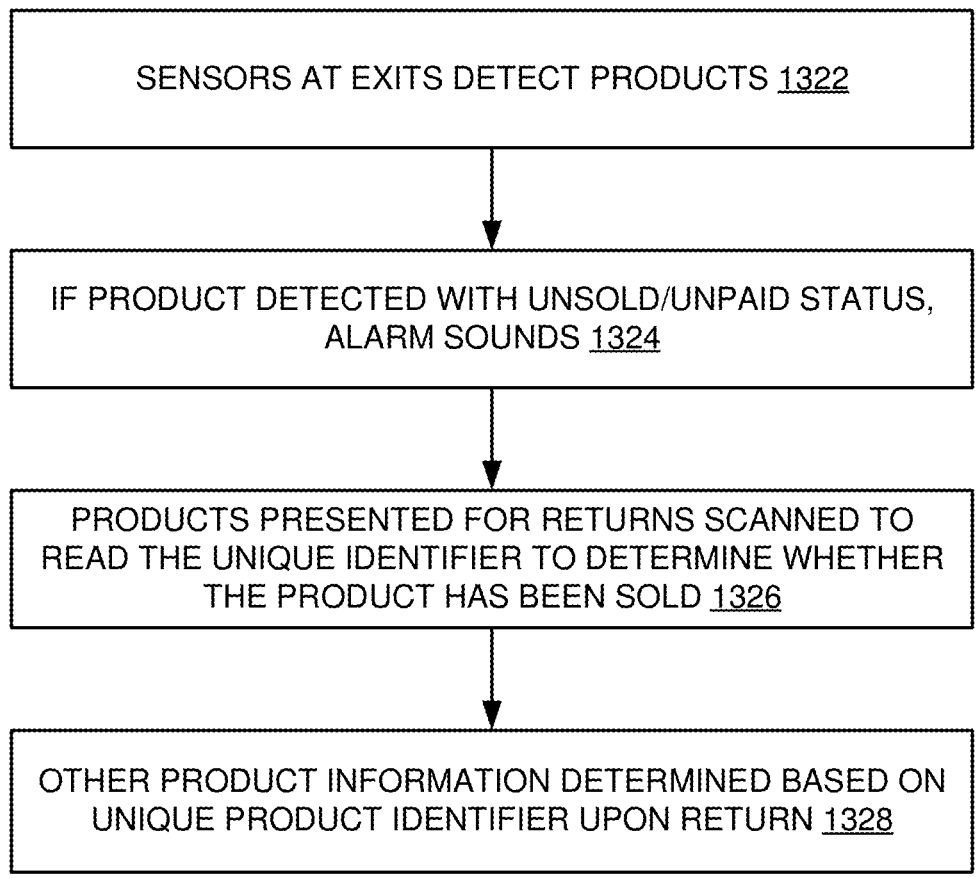
FIG. 13 illustrates additional security features that can be accomplished using an enhanced product tag.

FIG. 13 illustrates additional security features that can be accomplished using an enhanced product tag. With reference now to FIG. 13, at operation 1322 sensors at security gates or other sensors at exit points detect products that are exiting the store such as products in the customer's hands or shopping cart. As noted above, where purchase of a particular instance of a product is confirmed, the retail system can be updated to reflect the purchase of that instance of the product, indicating that the product can be removed from the premises without issue. This can be accomplished by updating the database associated with the unique product identifier that corresponds to that instance of the product that was purchased.

Where the purchase is not confirmed, the exit sensors can detect the attempted removal of an unpurchased product and generate an appropriate alert indicating a possible theft or unauthorized removal of the product. The alert can include, for example, audible and visual alerts as well as notification to retail security or other personnel about the possible theft of the device. This is illustrated at 1324. Because the possible theft can be determined based on an RF interrogation of a unique product ID associated with the enhanced product tag, and because the status of a purchase product can be updated automatically and in real time, security monitoring can be automated. Therefore the manual processes required with conventional spider wraps and EAS devices can be avoided in some applications.

Where the product is recovered, it can be returned to inventory in the database can reflect the status of the product still in inventory. Where the product is not recovered, the database can be updated to reflect that that particular instance of the product has been stolen or otherwise removed without authorization. Where this is the case, this can be used to prevent returns of the product, prevent warranty repairs of the product, alert law enforcement, and so on. In some embodiments, RF interrogators can be placed in public locations outside of the retail establishment such as, for example, within a mall, in a shopping district, on the streets, and so on, so that a stolen product can be tracked from the retail location as it is carried away. This information can be provided to law enforcement authorities to locate the thief, locate the ultimate destination of the product (e.g., the thief's home or warehouse, the location of a fence for stolen goods, and so on), and possibly recover the product. Tracking location information as a product leaves the premises to its destination can also provide evidence in a court of law if needed.

As noted above, the enhanced product tag can also be used to provide a secure process for returns. At operation 1326, when a customer presents a product for a return, the enhanced product tag can be read to determine whether the product was actually sold. Because the enhanced product tag includes an RFID tag or other like RF communication capabilities, the products can be read as soon as they enter the store and the location of the product can be tracked throughout the store (e.g., from the front door to the return counter, or through some other path). Thus, the store can confirm that the customer proceeded directly to the customer service counter as soon as he or she entered the store with the product. Also, the system can detect if a product that has not been purchased is being brought into a store by comparing the scanned ID upon entrance to the database. In various implementations, an alarm can be triggered if the product status is tagged as unsold (i.e., payment has not been made for the product) and the customer is bringing the product into the store or toward the return counter.

Also, because the enhanced product tag includes a unique product identifier, the enhanced product tag can help prevent return fraud because it can be used to verify that the product being returned is the exact same instance of the product that was sold. In other words, not only can the system be used to show that a product of that make/model was sold, but it can determine and verify whether it is the same instance of a product sold that is also being returned. This can be used to identify occurrence of, for example, a customer buying a newer version of a product and returning in its place an older or used version of the same product that he or she previously purchased. This can be especially effective where the unique product code is affixed internally to the product. This can also be effective where the unique product ID can be tied to the serial number and the retailer can enter the serial number at the point of return to confirm that the same unit is being returned.

At operation 1328, other product information can be determined based on the unique product identifier when the product is returned. As noted above, the system can verify that it is the exact same product that was purchased that is now being returned. Similarly, the system can be configured to determine the exact price at which the product was sold, the customer to whom the product was sold (e.g., such as via information included with purchases using an app, or via determination through the payment information, etc.) the exact retail location at which this particular product was purchased, the date of purchase of this particular product, and so on. Because the enhanced product tag can be uniquely tied to a particular unit (as opposed to a UPC code which can only identify a product, but not a particular unit), these additional security and tracking features can be implemented.

This information can be used with machine learning and AI algorithms to provide users with additional enhanced features such as, for example, projections for current and future sales revenues for products, geographical sales heat maps and inventory control, and future product positioning to match customer demands. Enhanced tracking information can be used to better match product offerings with consumer buying habits and to predict these buying habits in the future.

In addition to electronic devices, tokens can be protected using similar techniques. This may include, for example, credit cards, debit cards, loyalty cards, gift cards or other like tokens. Chip cards and other like devices include embedded circuitry and may be considered electronic devices that can be protected using the systems and methods described above. Similarly, magnetic stripe cards and the like may also be considered electronic devices that can be protected using systems and methods described above in which the circuitry in the form of software/instructions can be embedded on the magnetic stripe. However, some tokens do not include a chip or magnetic stripe. In such applications, the token may be assigned a unique identification number that is unique to that token. At the point of sale, the number may be scanned and payment for the token verified. Upon receipt of payment, the point-of-sale terminal notifies the card issuer to activate the card on the server. Similar to embodiments described above, the unique identification number can be linked to the card at the server such that the appropriate card can be validated.

Figure 14:
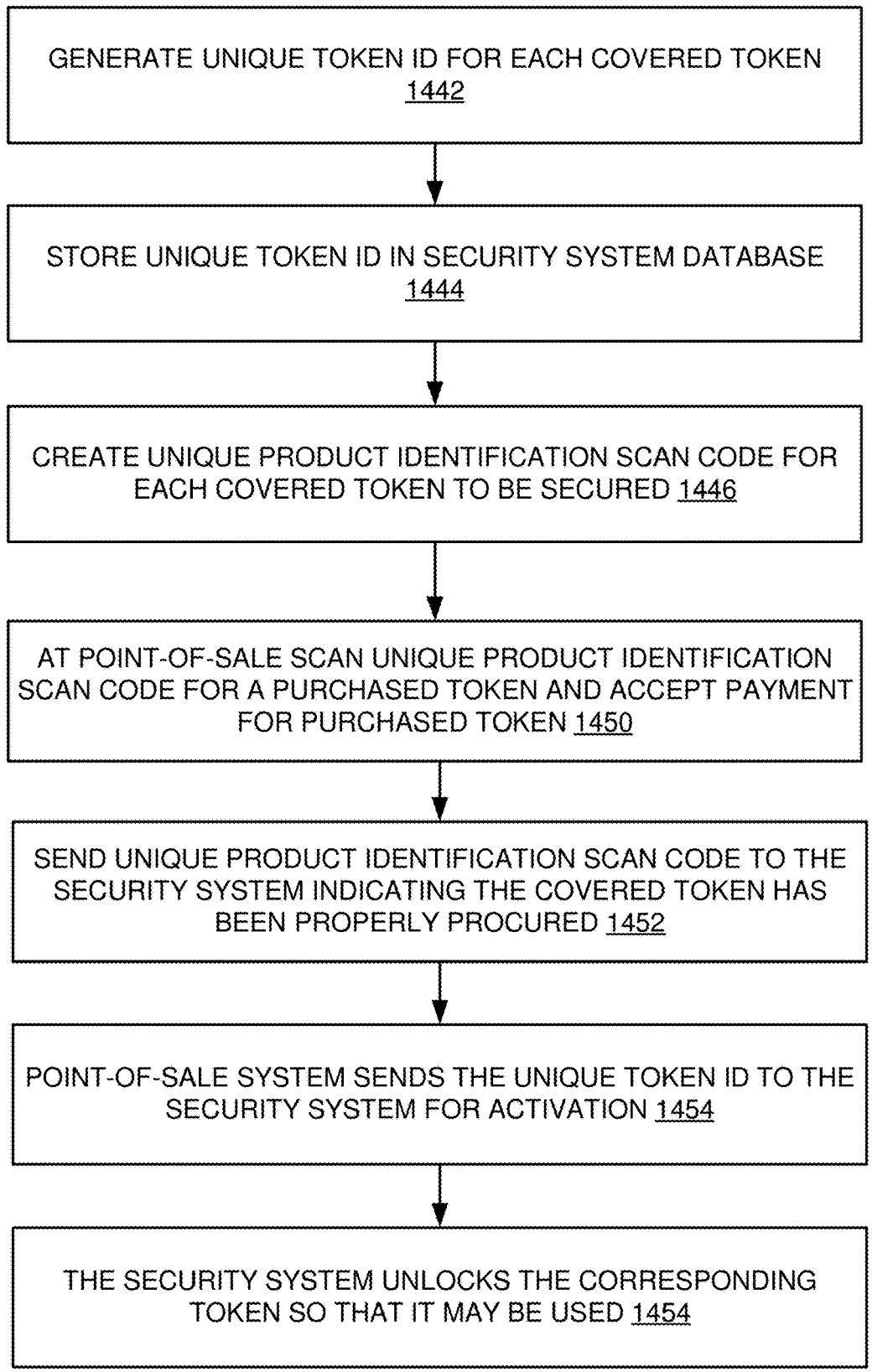
FIG. 14 illustrates an example process for securing tokens in accordance with various embodiments.

FIG. 14 illustrates an example process for securing tokens without circuitry in one embodiment. At operation 1442, the system generates a unique token identification code for each token to be covered. As described above, the unique token identification code can be sufficiently unique to uniquely identify each individual token within a group of multiple tokens. The unique token identification code can include, for example a numeric, alphanumeric, ASCII or other string that can be used to identify its corresponding token. It can include, for example a product identifier code which might not uniquely identify each product within a group of like products (e.g., a UPC or other standard or non-standard product identifier) and a unique security code to uniquely identify the products. At operation 1444, the generated unique token identification code is stored in a security system database.

The unique token identification code can be encoded onto a product identification scan code for each covered token to be secured. This may allow, for example, the unique token identification code to be read at the point-of-sale. Accordingly, at operation 1446 a product identification scan code can be created in the form of a barcode, QR code, or other tag that can be read by point-of-sale equipment. In some embodiments, the unique token identification code can be inscribed upon (e.g. printed, embossed, written, engraved, etc.) or otherwise affixed to (e.g., via a label, sticker, placard, etc.) its corresponding token so they can be read by a human operator and manually entered into the point-of-sale system. In some embodiments, a unique product identification scan code can include information in addition to the unique token ID, while in other embodiments the unique product identification scan code includes only unique token ID.

At the point-of-sale, a point-of-sale system scans the unique product identification scan code for a token to be purchased and accepts payment for that token. This occurs at operation 1450. As noted above, the unique product identification scan code can be a coded version of the unique token identification code (e.g., barcode, QR code, etc.), it can be a set of numbers or alphanumeric characters inscribed upon or otherwise affixed to its corresponding token (e.g., the unique token identification code itself), or it can take some other form that can be read by a machine or a human. Where inscribed upon or affixed to the token in human readable form, an operator at the point-of-sale can read the identification code and enter it into the point-of-sale system so that it can be sent to the security system for activation of the corresponding token. For example, the operator may manually hand enter the code through a user interface such as a keyboard, keypad, touchscreen, or other user interface. Where machine readable, an optical, RF or other scanner may scan the code to obtain the unique token identification code for transmission.

At operation 1454, the point-of-sale system determines the unique token identification code for the purchase token and sends the unique token identification code to the security system for activation. In some embodiments, the point-of-sale system first verifies that payment for the token is approved before sending the unique token identification code to the security system.

In response, the security system receives the unique token identification code and verifies that it is for a token that has not previously been activated. For example, a processor or other circuitry at the digital security system can check the security system database to determine whether the unique token identification code is a valid code and whether the token corresponding to that received unique token identification code has previously been activated. Upon successful verification, the security system unlocks the corresponding token so they can be used. If the unique token identification code is not valid or if the token corresponding to the received unique token identification code has previously been activated, the activation request can be declined.

The database can also store activation status for the various tokens in circulation or use. For example, when a new token is created and its corresponding unique token identification code created, that code can be stored in the database and the status can be marked as inactive. When a token is purchased and the point-of-sale system sends a request for activation of the purchased token, the digital security system can update the database to indicate that that purchased token has been activated. Accordingly, if another request comes in to activate the same token, that request can be denied. The database can also store token values for created tokens. Accordingly, when a token is activated the value associated with that token can be provided to the user and can be tracked in a database. As the value changes (e.g., through loyalty earnings, other earnings, drawdowns or charges, and so on) that value can be tracked. In some instances, the value is tracked by a third party merchant (e.g., a bank or other financial institution, a merchant associated with a loyalty program, and so on) in which case the initial value upon activation can also be sent by the digital security system to the $3^{rd}$ party merchant.

The security system can also send an activation message to the point-of-sale terminal confirming that token purchased has been activated and is ready for use. In some embodiments, the purchaser can enter his or her contact information (e.g., into the point-of-sale system or otherwise) so that the security system may send the purchaser the activation message directly. The activation message may include a token number required to enable the token to be used for commercial transactions. The token number may be provided to the user such as by sending the code electronically to his or her device, or by printing the code on a receipt for the purchase.

Similarly, where a token activation request is declined, the digital security system can send a message to the point-of-sale terminal (or the user) indicating that the token being purchased has been declined. Decline messages such as this may be used for many purposes including to help prevent or identify fraudulent activities. For example, if the purchaser purchases a fraudulent token (e.g., a copy of a token that has been previously sold or a phony token) the receipt by the purchaser of a message from the security system that activation has been declined alerts the purchaser to the problem. A message that the activation has been declined can include additional information such as, for example, the reason of that the client (e.g., previously activated card, card not present in database, and so on).

Figure 15:
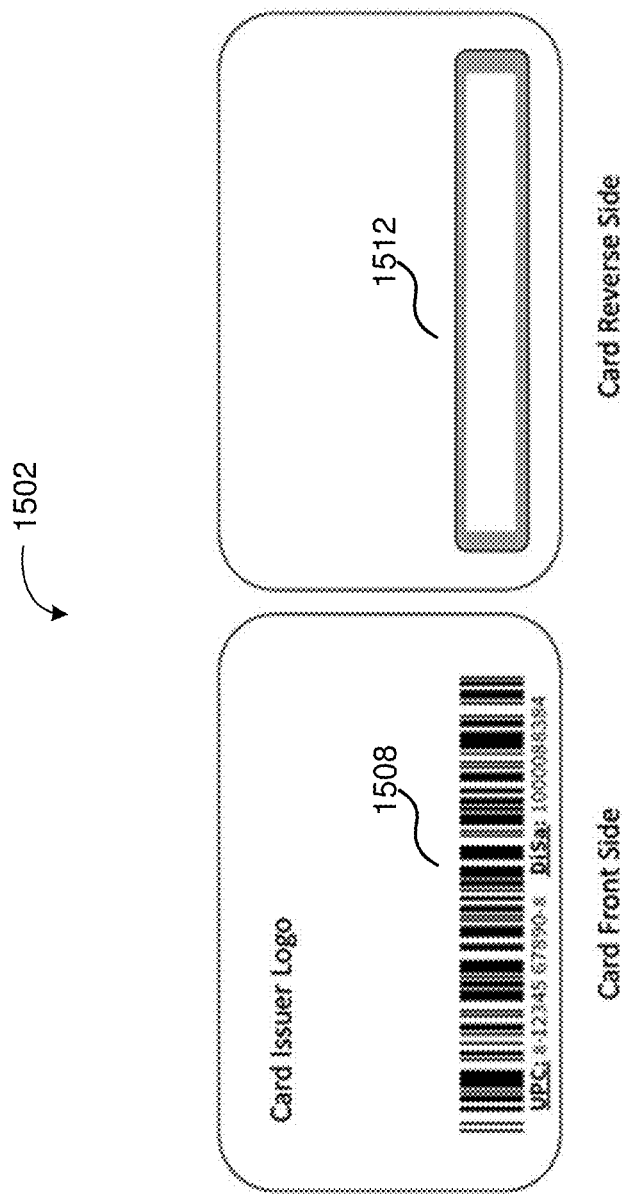
FIG. 15 illustrates an example using a unique token identifier number to secure tokens.

FIG. 15 illustrates an example of a unique token identifier number that can be used to identify a corresponding card in accordance with one embodiment. The card identifier can be established to uniquely identify a particular token (e.g., within a group of tokens) such that there is a unique token identifier number corresponding to each token's card number and PIN.

In embodiments, this unique token identification number may be affixed to the token (e.g., embossed, engraved, printed, attached, etc.) and encoded with a conventional token identifier (e.g., a UPC or other standard or non-standard product identifier) and a unique security code for the token. Only the unique token identification number is affixed to the token or its underside. There is no security concealment film foil needed because the PIN or token number need not be included on the card and hence the cost of producing the card may be reduced.

The example illustrated in FIG. 15 shows a unique token identifier number 1508 printed on a front of the example token 1502. It could also be affixed to another location of the token, whether on the front or rear side. In some embodiments, this information may be encrypted.

Figure 16:
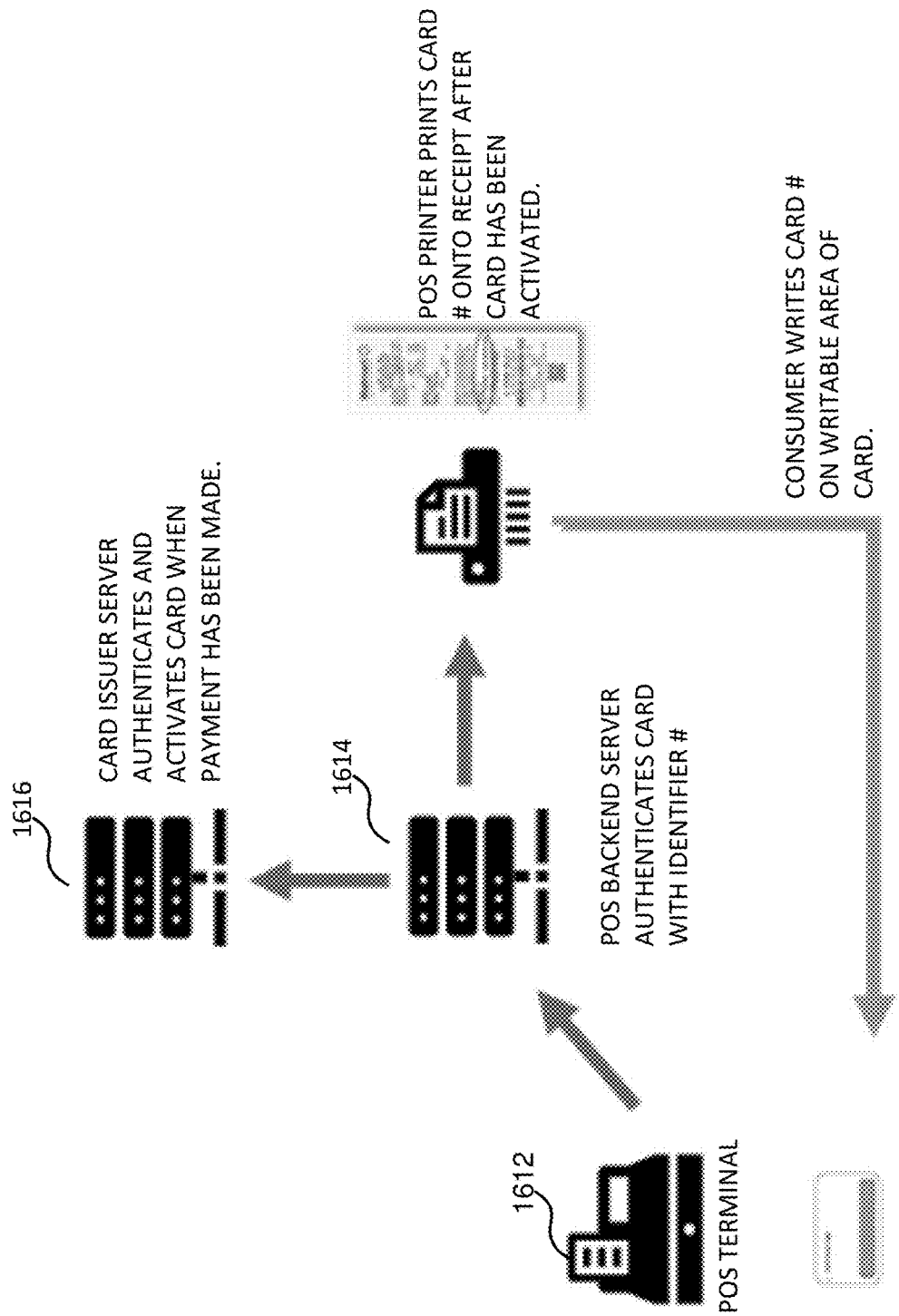
FIG. 16 is a system flow diagram illustrating an example system and process for securing tokens in accordance with various embodiments.

FIG. 16 depicts an example of token activation and authentication in one embodiment. In embodiments where the token is purchased in a retail sale transaction (e.g., a cash, retail purchase), the cashier (or purchaser in a self-checkout scenario) scans the unique token identification number 1508 for the token at the point-of-sale terminal 1612. The point-of-sale terminal 1612 sends the unique token identification number 1508 (all of it, or just the unique token number) to the back end security system 1614 where the system backend server decrypts the unique token identification number 1508 for the UPC and the unique security code. The server uses this information to validate the card authenticity, checking to confirm that the corresponding information is in the security system database and is accurate.

Once authenticated, authenticity status is also sent to card issuer 1616 to activate the card. This can be sent directly from the backend security system 1614, or it can be sent through the point-of-sale terminal 1612 to the issuer 1616. In some embodiments, the security system 1614 is a system of the issuer, or it may be a separate system or service provided to an issuer or to multiple issuers.

Once the authentication operation is performed, the information confirming authenticity (or denying if that is the case) is sent to the point-of-sale terminal 1612. The can be sent directly by issuer to the point-of-sale 1612, or it can be send from the issuer 1616 to the security system 1614, which would transmit the authentication message to the point-of-sale terminal 1612. If confirmed authentic, the actual card number for the specific token purchased (the card number corresponding to the unique token identification number 1508) is also sent to the point-of-sale terminal 1612 where it provided to the card purchaser. For example, the token number can be printed onto the receipt. In other embodiments, the token number could be sent to the purchaser directly such as, for example, where the purchaser provides his or her email address, SMS number or other correspondence address.

The consumer may then write down the token number in the writable area in the card 1512 or in another place of his or her choosing. In this process, the token number is not exposed to anyone except to the consumer after payment has been made. Would be thieves are unable to extract the card number by inspecting the cards (e.g., removing and replacing the concealing foil) at the merchant location.

In another embodiment, a unique token identification number is associated with the token number (e.g., gift card number) and it's corresponding PIN. This unique token identification number is embedded and encoded with the token UPC and security code. Only the unique token identification number is printed on the token or its underside. There is no security concealment film foil needed and hence the cost of producing the token is highly reduced. An example would be in FIG. 15.

A token number (or PIN) would be require to use the token in transactions (e.g., to use a gift card to make purchases) and in this embodiment the token number is not included in the unique token identifier number nor is it otherwise provided on the card. Accordingly, information required to use the card for commercial transactions is not present on the card. In the event that a would-be thief tries to take a photo of the token or otherwise capture the token identifiers, only the unique token identification number would be exposed. This unique token identification number has no value to the thief as the token issuer only recognize the token # and that token # must be obtained in these embodiments from the security system.

Figure 17:
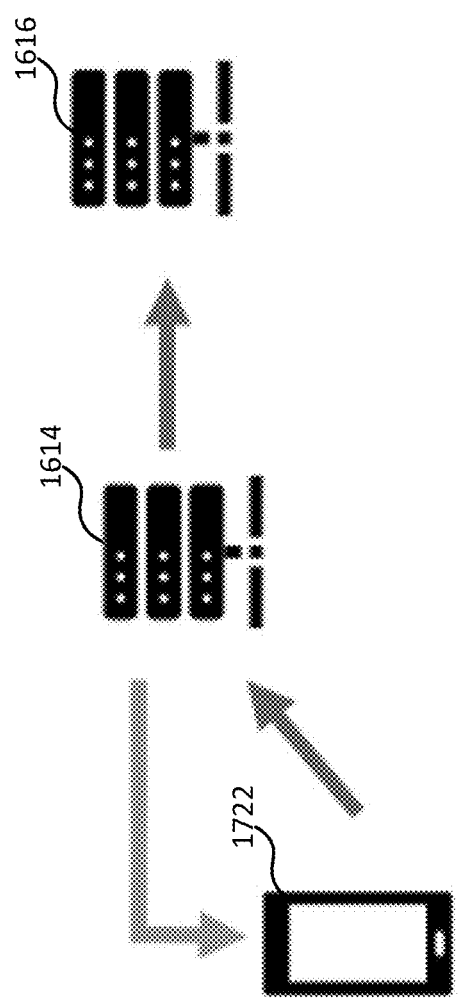
FIG. 17 is a system flow diagram illustrating an example system and process for securing tokens in accordance with various embodiments.

App purchases are also contemplated as a method to conduct a point-of-sale transaction. FIG. 17 illustrates an embodiment for app-based token purchases. When the consumer pays for the token using a mobile app (e.g., on a smart phone or like device 1722), the consumer scans the token unique identifier # or inputs the value (e.g., alphanumeric or numeric) into the app using a GUI. The app communicates with the backend server of the security system 1614 and enables the consumer to make payment online, which can be made, for example, via in-app purchases, credit or debit cards, account transfers, fintech payments or other payment methods). Once payment has been made, the security system 1614 will communicate with the token issuer 1616 to activate the token. At the same time, it will display the token # to the consumer on his or her device 1722. The consumer can then write down the token # (e.g., in the writable token area or elsewhere) and he or she may choose to digitize the token and store it in an app e-wallet. The digitized token can then be transferred to other parties such as for a gift. In this process, the token # is not exposed to anyone except to the consumer after payment has been made.

Token embodiments such as the examples described above, may be implemented using systems similar to those described herein for other embodiments. For example, the systems illustrated in and described with reference to FIG.

9 can be used to generate unique token IDs (e.g., unique product ID generator circuit 911) and unique scan codes (e.g. unique product scan code generator circuit 914). A processor in the security system 968 can be used to manage operations of the security system as well as to check codes for unlocking more activation. Because the token can be activated based on the unique token ID, such token embodiments may be implemented without an activation code generator circuit 912. Similarly, data storage 928 can be used to store the token IDs and unique product scan codes and communication circuit 933 can be used to provide communication with the point-of-sale system, token manufacturers, purchasers of tokens or other devices and others.

In various embodiments described herein, as is understood by one of ordinary skill in the art, rights in tokens, electronic devices, software, media and other technology may be transferred to a purchaser in a number of different ways. For example, a purchaser may obtain legal title to the item being purchased. As another example, a purchaser may only obtain a license or other right to use the item being purchased. Similarly, one of ordinary skill in the art also understands that purchases are not exclusively transacted with currency of may also be transacted with other forms of consideration.

FIG. 18 illustrates an example high-level architecture for a system to capitalize on the capabilities of an enhanced product tag in accordance with various embodiments. With reference now to FIG. 18, this example includes a server and one or more databases 1822, a warehouse/storage location 1824, a retail smart shelf system 1826, antitheft gates/mechanism 1828, a point-of-sale scanning and payment system 1832, and an automatic checkout system 1834.

As noted above, system databases can be used to log the unique product ID and the enhanced product code with a product manufactured, and the databases can be updated as an individual product travels through the supply chain to the retailer, and as the product is purchased and even if the product is returned. In some embodiments, a centralized database (one or more data storage units) can be located with a server such that the information is kept in one place (whether a single database or group of databases or cloud-implemented data storage, or other mechanism) so that the product can be tracked by all entities authorized to access the database. In other words, the manufacturer can create the data for the product, and various entities in the supply chain can login and access the data such as, for example, warehouses, distributors, retailers, etc. Also, law enforcement personnel may also have access to the database. In other implementations, the database can be distributed such one or more of the locations in the supply chain can have their own database and the information passed from database the database as a product travels through the supply chain. Thus, each party may have local or unique access to data pertaining to products within its domain.

The database can also be used to authenticate and unlock the product such as described above with reference to FIGS. 6-10, for example. However, in yet further embodiments, product unlocking may be accomplished automatically based on the purchase using the enhanced product tag. For example, when payment for a particular product is verified and the exit sensors or other sensors confirm that the product has been removed from the store, as noted above the database is updated to confirm the purchase.

This update can also be used to trigger an authentication process to unlock the device. For example, the system can be configured to automatically unlock the device once a purchase is complete, assuming the device has communication capabilities for such an unlock operation. As another example, upon verification of payment, the user's scan and go app can receive an authorization code that can be entered into the device to unlock the device. In such examples, the authorization code need not be (but may still be) printed on the receipt for the customer. Instead, the authorization can be provided automatically to the customer such as through the app, through his or her text or email, and so on.

Warehouse/storage 1824 can provide distribution or storage for products as part of the supply chain. These can be manufacturing warehouses, distribution warehouses, or retail warehouses, for example. Warehouse/storage 1824 can include appropriate RF interrogators to interrogate products as they enter the warehouse, leave the warehouse, and even as they might be moved from shelf to shelf or location to location within the warehouse. Accordingly, inventory can be maintained in real time (or as often as the enhanced product tags are interrogated) and product location can be facilitated. As products are moved the appropriate database can be updated so the location of the products can be tracked as they enter or exit the warehouse domain or as they move within the warehouse. Tracking products from the manufacturer through the supply chain to the ultimate customer, and to a return, allows the history of each product to be created and can further facilitate resolution of issues when products are returned, if products are lost, or if products are stolen.

A smart shelf environment such as a retail smart shelf system 1826 can be used in conjunction with enhanced product tags to further allow tracking and monitoring capabilities for products. As in the warehouse, sensors or array of sensors can be included within a retail facility so they can read the enhanced product tags of the products housed within the retail facility. This can include products on retail shelves, products at the retail storage room or retail warehouse, products and special display areas, products moving through the retail facility such as on a stock clerks cart or a shopper's cart, products at a checkout stand, products outside the store or in the parking lot, and products leaving the store.

Accordingly the location of every product inventory that includes an enhanced product tag can be tracked upon interrogation of the system. This can be used to facilitate a number of operations such as product inventory. Current inventory levels can be tracked, rate of sales can be monitored, and orders for new supplies of the product can be generated based on inventory levels and customer demand. The database can also be updated with current leadtimes for the product, and delivery schedules for products on order such that information such as the length of time required to replace the products as well as products in shipment can be used to tailor reordering of tagged products. For example, a high rate of sales coupled with a long lead time may drive a more rapid reordering of products. Algorithms can be implemented to track the projected date at which the current supply will be exhausted and the amount of time it will take to replace that supply to place the order at the right time and with the right delivery schedule to maintain a proper inventory for the product.

In-store tracking can also be used to help customers and store personnel locate products. Customers and store personnel can be provided with an app that allows them to quickly locate products and inventory tagged with an enhanced product tag. Even if products were recently moved, misshelved, or otherwise not properly located the RF interrogators can locate an actual location of an instance or instances of a desired product and direct the shopper or store personnel to that product. In some implementations, the customer may be given the opportunity to flag a product and inventory as a product that he or she intends to purchase so that that product can be effectively "held" for the customer while he or she (or a worker) travels through the store to retrieve it.

The system can also be used to track if multiple instances of the same product are at different locations in the store. In some instances a retail environment may wish to have the same product at different locations to enhance impulse buying. However in other instances, the store may wish to have the inventory combined in one location. The enhanced product tag can help identify product locations and fill facilitate arrangement of inventory per the store's desire. The system may even identify where a product has been "abandoned" and someone shopping cart. If a product was detected as moving from a shelf and is traveling through the store (such as if it were in a shopper's cart) and then rests at one location for a long period of time, the system may flag this product as potentially left in a cart that has been abandoned by the shopper. In a similar manner, the system can tell whether a shopper removed a product from the shelf and placed it somewhere else in the store where it does not belong. This can facilitate reorganization of inventory by workers within the store.

Additionally, the system can be configured to generate alerts or otherwise worn store personnel when stock of a product is low on the shelf. This can allow store personnel to replenish "outs" or to reconfigure shopping areas to address slow-moving products. The system can also be used to provide insight into product movement and stagnation not only for products themselves but also for locations within the store, times of day, days a week, dates, seasons and so on. For example, the system can track sales of the products at and caps versus in-line placement in retail shelves, or otherwise track sales at various locations in the store. Accordingly, the system can provide valuable insight as to which areas of the store move products when and which areas of the store don't. The system can be configured to generate a heat map of store location sorted by time, date, product type, and other attributes to help configure the retail environment to be a more productive environment. Tracking product movement can also help with product ordering strategies, stocking and restocking strategies, timing of incentives, product ordering, and so on.

In conjunction with the retail smart shelf, one or more workstations for user terminals can also be provided such as, for example, a personal computer, a workstation, a tablet, and app enabled device, and so on to allow store personnel to access the features of the retail smart shelf in real time as they do their jobs, as well as to look at historic data and generate reports and perform analysis as needed. Retail personnel can use their terminals to locate products, check inventory, determine when new shipments are arriving, determine whether other stores in a chain have a product customers are looking for, track movements of products in real time, get alerts for low stock or out of stock items, and otherwise obtain the information described herein. Associate terminals can be set up to handle products for particular departments or for product storewide. Access hierarchy can be provided such as, for example, store managers can be given higher levels of access than store clerks, and so on. Customized reports can also be provided such that retailers can determine at the push of the button how well a product is moving, which products are strong sellers, which products have a lot of returns, number of days of remaining inventory for products, product locations, and so on.

Point of scale scanning and payment system can be used to facilitate the checkout process for products including an enhanced product tag. As described above, sensors to interrogate the enhanced product tag can be included to provide wireless scanning of products as they are presented for sale or while they are still in the shopper's cart as the shopper moves through the checkout process. RF interrogation techniques can scan multiple products in a cart to provide faster checkout. These can be combined with conventional techniques such that customers can purchase products that don't have enhanced smart tags along with products that do have enhanced vortex. As also noted above, customer applications can be provided on customer devices to facilitate the checkout and payment process.

Scanning devices outside of the checkout area (e.g., between the checkout stands and the exits) can be used to scan for products in these areas that have not been purchased and paid for. This can be used to generate an alert or warning to the customer or to store personnel before the product leaves the store. Antitheft gates 1828 or other like mechanisms including sensors to detect the enhanced product tags at the exits of the stores can be included to ensure that tag products have been paid for before they leave the store.

Where the sensor detects a product leaving the store that has not been paid for, an alert can be generated such as an audible or visual alert, to alert the customer and nearby personnel that a product is about to leave the store that has not been paid for. Additionally, messages can be sent to store personnel such as security guards, store managers or other store personnel. These messages can take the form of SMS or MMS messages, emails, telephone calls, audio messages or other alerts to alert the appropriate personnel that a theft may be in progress. If such an alert is generated, store personnel can scan the enhanced product tag and check the unique product identifier associated with that tag in that product to determine whether the product has in fact been purchased and if so, determine why the system hasn't been updated to reflect the purchase. Of course, if the product is not been purchased, appropriate action can be taken to re-shelve the product and deal with the offending customer in an appropriate manner. In some implementations, law enforcement can be alerted as well.

In further embodiments the location of the potentially stolen product can be tracked as it leaves the store through the parking lot using RF interrogators positioned in the parking lot. In some implementations, cameras in the parking lot can be coordinated with the product location tracked by the sensors such that the visual identification and perhaps license plate the customer's vehicle can be recorded where theft is thought to have occurred. Likewise, because the system can track the location of the exact product as it travels through the store. Product location information from in-store sensors can be used to correlate image information from store security cameras to obtain a visual identification of the customer as he or she performs acts such as, for example, removing the subject product from the shelf, caring the subject product through the store, and transporting the subject product out the door. This visual record correlated with the exact instance of the product that was removed can be used to either verify that the user did in fact purchase the product and an error was made in reporting the purchase, or that the user left or attempted to leave the store without paying for the product.

Facial recognition software may be used to identify the suspect. In some applications, the scan and go app may require that the user scan his or her face to operate the app. This can be used to authenticate the user for the app as well as to facilitate identifying the user in the event of an attempted theft. Users can be scored based on their behavior such as, for example, the number of purchases, the number of returns, attempted falsifications of returns, attempted desk, and so on.

Users with good purchasing histories can be rewarded with coupons or other incentives. Additionally, users purchasing particular types of products can be given incentives to purchase complementary products for may be given incentives from competing manufacturers to purchase competing products. As one example, a user purchasing a portable electronic device may be given the option to purchase batteries that go with that device through the scan and go app. The user can be presented with the accompanying purchase and also presented with a yes/no button to opt in or out of the purchase. Where the customer ops to make the complementary purchase, the app can direct the customer to the exact location in the store where the batteries are kept. In some implementations, store personnel may retrieve the batteries for the customer and hold them at the checkout counter for the customer when he or she presses the yes button to make the complementary purchase. As another example, a good customer may be given the option for a free upgrade, or an upgrade at a reduced price as a reward to the customer. Accordingly, the system can be configured to integrate loyalty and incentive programs to accompany or to replace old-fashioned coupons and punch cards using automated checkout in mobile payment applications.

In some applications, the system can check inventory and offer special deals for items that have a high level of inventory when a customer ops to purchase an item that is lower in stock. This can help the retail establishment move items that are not moving as quickly. For example, where user initiates purchase of a particular model of an item that is low in stock, the app may automatically present the user with an alternative option to purchase a competing model for which the retail establishment has a large quantity on hand. The customer may be notified that this competing item is on sale or otherwise available at a discount if the customer ops for that purchase now instead of purchasing the item he or she originally intended.

In some embodiments, the customers may be given the ability to access some of the information in the system database regarding products that the customers purchased. For example, a customer may be able to log into the database and retrieve information about the product he or she purchased, the date and time of the purchase, the manner of payment, the amount of the purchase, the retail location at which it was purchased, retail locations at which the product may be returned, and so on. The user may also be able to use this information to download or access online user manuals, operating instructions and so on. The user may also be able to use this information to locate accessories or complementary products that he or she may wish to purchase to augment or go along with the purchased product. Accordingly, the system can be used to drive additional sales for accessories or similar products that may be of interest.

FIG. 18 also illustrates automatic checkout system 1834. Such a system can include, for example, RFID readers or other RF interrogators that can interrogate enhanced product tags of products in a purchaser shopping cart as he or she approaches the auto checkout stand. The automatic checkout stand can interrogate the products in the shopper's cart, read the unique identification tags, provide the shopper with an inventory of products he or she is purchasing, provide a total for the purchase, and allow the shopper to complete the purchase or any of a number of payment methods such as the users app, credit or debit card at the checkout stand, Google or Apple pay, and so on. In some embodiments, visual scanning such as by cameras and image sensors can accompany the RF interrogation to verify that there are no items missing in the checkout process. Image recognition techniques can be used to recognize items in the cart and verify that the items recognized match those detected by the auto checkout stand.

Because the system is updated to only identify products that were detected and purchased as purchased products in the system, and automatic security check is put into place because it is only those products that are clearly of the store. Accordingly, if the automatic checkout stand fails to detect one or more products that the customer is intending to purchase, and accordingly the purchase is not made, the database is not updated to reflect the purchase. Therefore, if the customer attempts to remove these products from the store and appropriate alert is generated. Accordingly, the system has some level of foolproofness against accidental loss.

Figure 19:
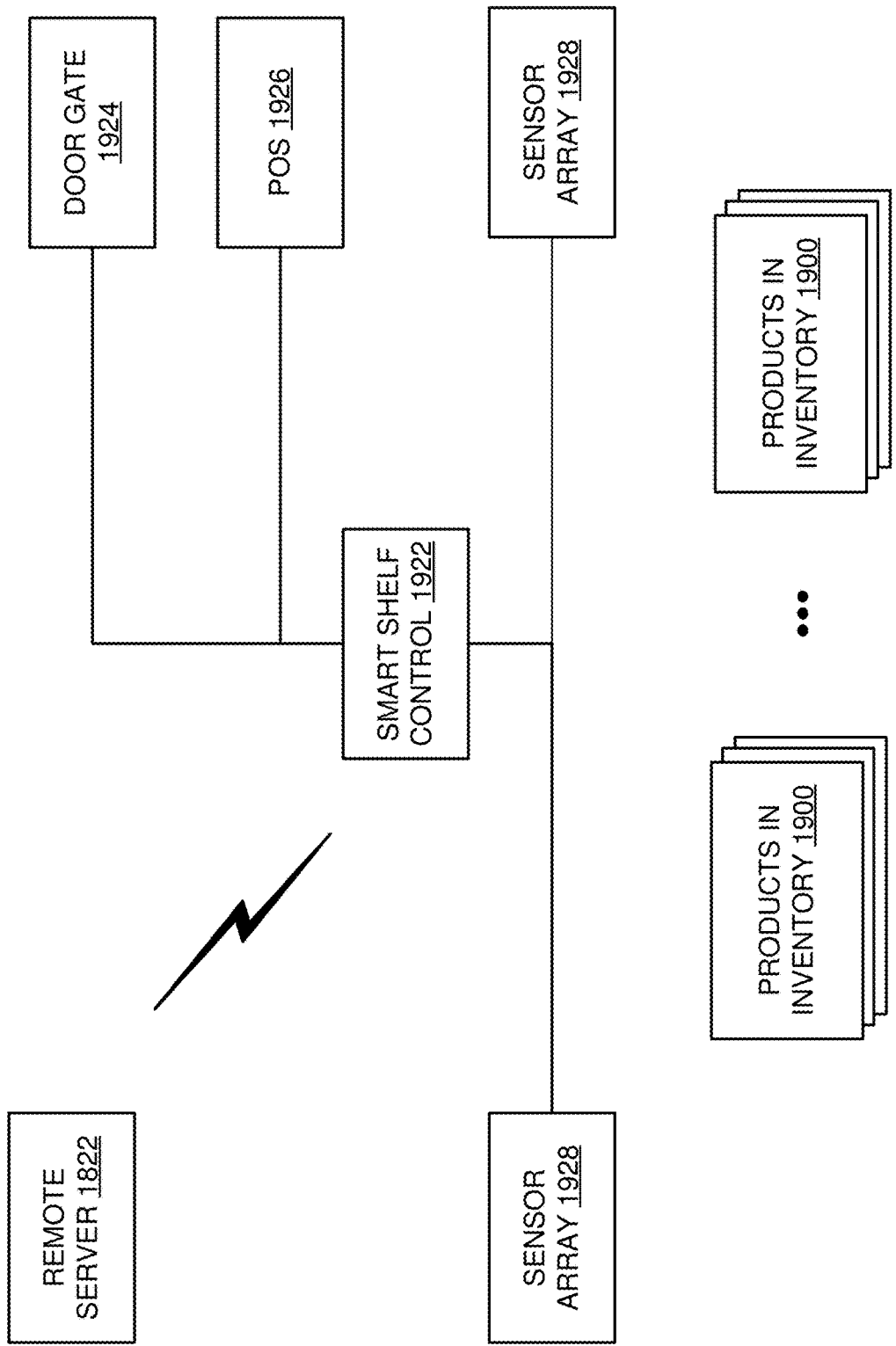
FIG. 19 illustrates an example system for product control in accordance with various embodiments.

FIG. 19 illustrates an example system for product control in accordance with various embodiments. In this example, the server and database 1822 communicates with the retail environment via a communication links such as, for example, the Internet, a cellular or telephone link, or other communication network. The Smart shelf system includes Smart shelf control system 1922, exit or security gates 1924, point-of-sale terminals 1926, a sensor array 1928, and products in inventory 1900. As described above, there can be a large number of products in inventory 1900 tracked by the system. Products in the inventory 1900 can include products at retail location, products and warehouse, or products at other locations in the supply chain.

Sensor array 1928 can include one or more sensors to interrogate the enhanced product tags of the products in inventory—whether a retail location or in a warehouse, etc. Triangulation and other techniques can be used to identify locations of specific products in the area being tracked. For retail establishments, a point-of-sale terminal 1926 can be included to track and record purchases of products in inventory. For example, this can include auto checkout stands, self-checkout systems, conventional checkout systems, purchase apps such as a scan and go app, and so on. Ideally, point-of-sale terminal 1926 can identify the unique product ID associated with the enhanced product tags so that the particular product being sold can be updated in inventory and marked as sold. This also allows the product sold to be cleared for removal from the store. The use of auto checkout stands or other wireless checkout can expand the consumer's convenience by avoiding the requirement to scan a barcode of each item at checkout counters. The presence of the unique product ID or labeling on the packaging can alert the customer that the product is eligible for wireless scanning, which can entice the customer to purchase the product due to the increased convenience.

Exit or security gate 1924 such as exit sensors or other antitheft gate can be included to detect removal of a product from the store. The unique product ID associated with an enhanced product tag being removed from the store can be checked against the database to confirm that the product was in fact purchased. As noted above, if the system detects that the product was not purchased appropriate alerts can be generated so that a potential theft or accidental removal can be avoided.

As illustrated in the example of FIG. 19, the systems tie into a smart shelf control system 1922 which can be used by store personnel (or warehouse personnel, etc.) to monitor and control the system and the inventory. As noted above, smart shelf control system 1922 can include a user terminal such as a workstation, tablet, laptop, or other user device to allow store (or warehouse, etc.) personnel to view various system parameters such as, for example, product inventories, sales rates, movement of products throughout the environment, and other information as described in more detail above.

As the above examples serve to illustrate, the product ID included with an enhanced product tag allow individual products (not just groups of products based on UPC) to be inventoried and tracked and therefore allows the implementation of enhanced security features.

Figure 20:
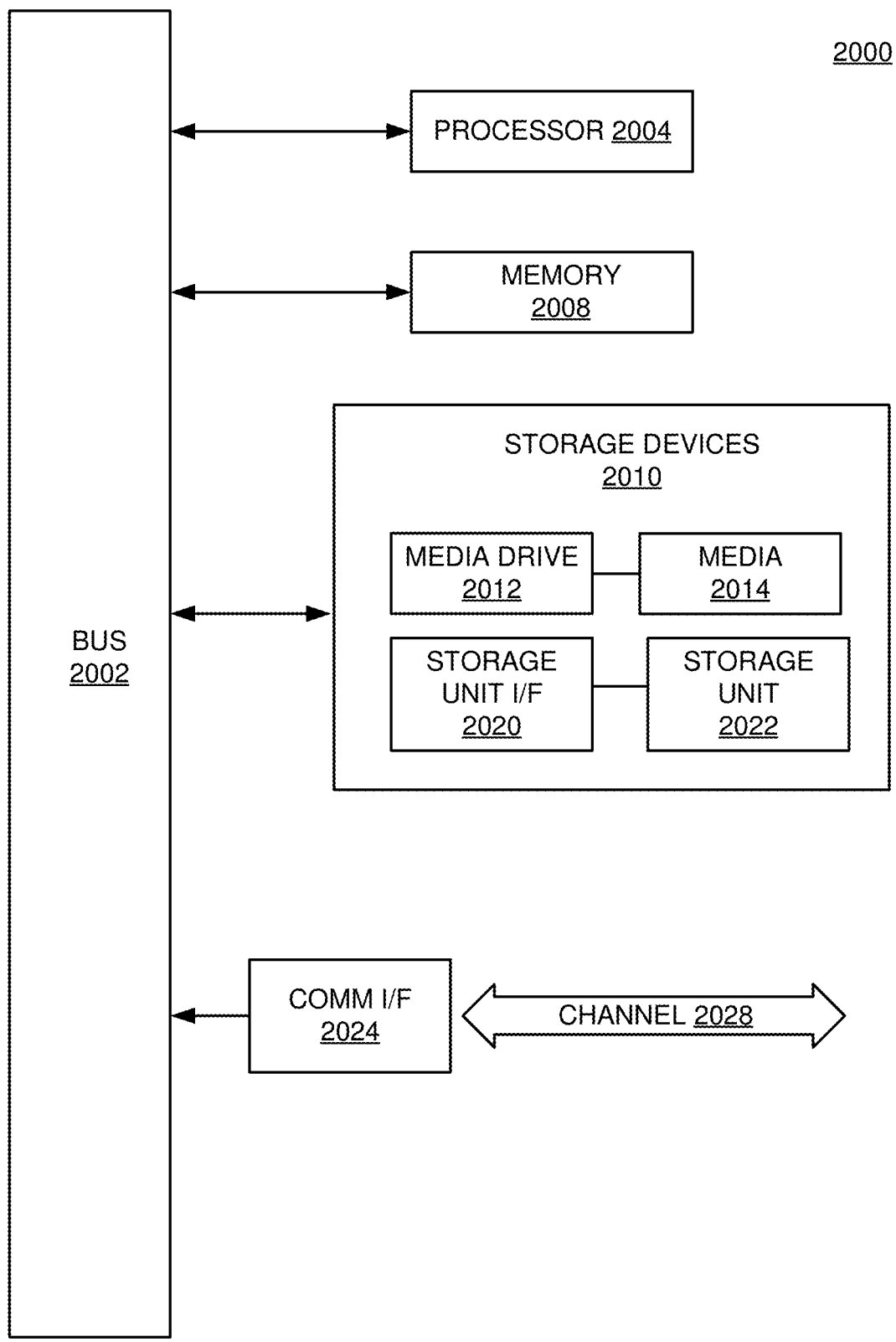
FIG. 20 illustrates an example computing module that may be used in implementing various features of embodiments of the disclosed technology.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 20. Various embodiments are described in terms of this example-computing system 2000. After reading this description, it will become apparent to a person skilled in the relevant art how to implement the technology using other computing systems or architectures.

Referring now to FIG. 20, computing system 2000 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 2000 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 2000 might include, for example, one or more processors, controllers, control modules, or other processing devices, such as a processor 2004. Processor 2004 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 2004 is connected to a bus 2002, although any communication medium can be used to facilitate interaction with other components of computing system 2000 or to communicate externally.

Computing system 2000 might also include one or more memory modules, simply referred to herein as main memory 2008. For example, in some embodiments random access memory (RAM) or other dynamic memory, might be used for storing information and instructions to be executed by processor 2004. Main memory 2008 might also be used for storing temporary variables or other intermediate information during execution of instructions to be executed by processor 2004. Computing system 2000 might likewise include a read only memory ("ROM") or other static storage device coupled to bus 2002 for storing static information and instructions for processor 2004.

The computing system 2000 might also include one or more various forms of information storage mechanism 2010, which might include, for example, a media drive 2012 and a storage unit interface 2020. The media drive 2012 might include a drive or other mechanism to support fixed or removable storage media 2014. For example, a hard disk drive, a floppy disk drive, a magnetic tape drive, an optical disk drive, a CD or DVD drive (R or RW), a flash drive, or other removable or fixed media drive might be provided. Accordingly, storage media 2014 might include, for example, a hard disk, a floppy disk, magnetic tape, cartridge, optical disk, a CD or DVD, or other fixed or removable medium that is read by, written to or accessed by media drive 2012. As these examples illustrate, the storage media 2014 can include a computer usable storage medium having stored therein computer software or data.

In alternative embodiments, information storage mechanism 2010 might include other similar instrumentalities for allowing computer programs or other instructions or data to be loaded into computing system 2000. Such instrumentalities might include, for example, a fixed or removable storage unit 2022 and an interface 2020. Examples of such storage units 2022 and interfaces 2020 can include a program cartridge and cartridge interface, a removable memory (for example, a flash memory or other removable memory module) and memory slot, a flash drive and associated slot (for example, a USB drive), a PCMCIA slot and card, and other fixed or removable storage units 2022 and interfaces 2020 that allow software and data to be transferred from the storage unit 2022 to computing system 2000.

Computing system 2000 might also include a communications interface 2024. Communications interface 2024 might be used to allow software and data to be transferred between computing system 2000 and external devices. Examples of communications interface 2024 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 2024 might typically be carried on signals, which can be electronic, electromagnetic (which includes optical) or other signals capable of being exchanged by a given communications interface 2024. These signals might be provided to communications interface 2024 via a channel 2028. This channel 2028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 2008, storage unit 2020, media 2014, and channel 2028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 2000 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

I claim:

1. A process for providing security to a locked token, the process comprising:
    a digital security system for:
        generating a unique token identification code for each locked token; and
        storing in a security system database each token identification code;
    for a locked token being purchased, a point-of-sale system obtaining the unique token identification code from the locked token being purchased;
    the point-of-sale system sending the unique token identification code obtained from the locked token being purchased to the digital security system for activation of the locked token being purchased; and
    the digital security system for:
        receiving the unique token identification code sent from the point-of-sale system;
        comparing the received unique token identification code with token identification codes in the security system database to authenticate the unique token identification code; and
        activating the unique token identification code,
    wherein a consumer upon purchasing the locked token receives an unique activation code corresponding to the locked token, enters the unique activation code, which is hashed by a hash function embedded in the locked product to create a verification hash string, and
    wherein the verification hash string is compared to an activation hash string and if the verification hash string matches the activation hash string, the locked token is unlocked.

2. The process of claim 1, wherein the unique token identification code for a given locked token to be secured comprises a numeric, alphanumeric, or ASCII string that uniquely identifies its corresponding locked token.

3. The process of claim 1, wherein the unique token identification code for a given locked token is inscribed upon or otherwise affixed to its corresponding locked token in a machine-readable form.

4. The process of claim 1, wherein the point-of-sale system validates payment for the procured locked token before sending the unique token identification scan code corresponding to that locked token to the digital security system for activation.

5. The process of claim 1, further comprising the digital security system verifying that the locked token corresponding to the received unique token identification code has not been previously activated prior to activating that locked token.

6. The process of claim 1, further comprising the digital security system sending an activation message to the point-of-sale terminal to confirm that the locked token being purchased has been activated.

7. The process of claim 1, further comprising the digital security system sending a message to the point-of-sale terminal indicating that the locked token being purchased has been declined.

8. The process of claim 1, wherein the unique token identification code for a given locked token is inscribed upon or otherwise affixed to its corresponding locked token in a human-readable form.

9. The process of claim 8, wherein the unique token identification code is read by an operator at the point-of-sale and manually entered into the point-of-sale system so that it can be transmitted to the digital security system to activate the corresponding locked token.

10. The process of claim 1, further comprising creating a unique product identification code for each locked token to be secured, wherein the unique product identification code for its corresponding locked token comprises the unique token identification code for that corresponding locked token.

11. The process of claim 10, wherein the unique product identification code comprises information in addition to the unique token identification code for that corresponding locked token.

12. The process of claim 1, further comprising the digital security system using the unique token identification code to determine a token number for the locked token being purchased and sending the token number for the token being purchased to the point-of-sale terminal at which the locked token is being purchased.

13. The process of claim 12, further comprising the point-of-sale terminal at which the locked token is being purchased printing a receipt for the locked token being purchased, wherein the point-of-sale terminal includes the token number for the locked token being purchased on the receipt.

14. A digital security system, comprising:
   unique token identification code generator circuit configured to generate a unique token identification code for each locked token to be locked;
   a database configured to store unique token identification codes generated by the unique token identification code generator circuit;
   a communication circuit configured to receive from a point-of-sale system a unique token identification code for a locked token purchased at the point-of-sale system;
   a processor configured to activate the locked token purchased at the point of sale system; and
   the communication circuit configured to send to the point-of-sale system and activation message indicating that the purchased locked token is activated,
   wherein a consumer upon purchasing the locked token receives an unique activation code corresponding to the locked token, enters the unique activation code, which is hashed by a hash function embedded in the locked product to create a verification hash string, and
   wherein the verification hash string is compared to an activation hash string and if the verification hash string matches the activation hash string, the locked token is unlocked.

15. The digital security system of claim 14, further comprising the processor updating the database to indicate that the purchased locked token has been activated.

16. The digital security system of claim 14, further comprising the processor checking a status of a locked token corresponding to a received unique token identification code to determine whether the locked token corresponding to the received unique token identification code has previously been activated.

17. The digital security system of claim 14, wherein the unique token identification code for a given locked token to be secured comprises a numeric, alphanumeric, or ASCII string that uniquely identifies its corresponding locked token.

18. The digital security system of claim 14, wherein the unique token identification code for a given token is inscribed upon or otherwise affixed to its corresponding locked token in a machine-readable form.

19. The digital security system of claim 14, further comprising the processor verifying that the locked token corresponding to the received unique token identification code has not been previously activated prior to activating that locked token.

20. The digital security system of claim 14, further comprising a point-of-sale system comprising a processor configured to obtain the unique token identification code from the locked token being purchased and to send the unique token identification code obtained from the locked token being purchased to the digital security system for activation of the locked token being purchased.

21. The digital security system of claim 20, wherein the processor for the point-of-sale system is further configured to validate payment for the procured locked token before sending the unique token identification scan code corresponding to that locked token to the digital security system for activation.

22. The digital security system of claim 14, wherein the unique token identification code for a given locked token is inscribed upon or otherwise affixed to its corresponding locked token in a human-readable form.

23. The digital security system of claim 22, wherein the unique token identification code is read by an operator at the point-of-sale and manually entered into the point-of-sale system so that it can be transmitted to the digital security system to activate the corresponding locked token.

24. The digital security system of claim 14, further comprising the processor using the unique token identification code to determine a token number for the locked token being purchased and sending the token number for the locked token being purchased to the point-of-sale terminal at which the locked token is being purchased.

25. The digital security system of claim 24, further comprising the point-of-sale terminal at which the locked token is being purchased printing a receipt for the token being purchased, wherein the point-of-sale terminal includes the token number for the locked token being purchased on the receipt.

26. A process for providing security to a token, the process comprising:

a digital security system generating a unique token identification code for each device to be locked, wherein the unique token identification code uniquely identifies its corresponding locked token but does not include a token number required to conduct transactions using the locked token;

the digital security system storing in a security system database the unique token identification code and token number for each locked token;

for a locked token being purchased, a point-of-sale system obtaining the unique token identification code from the locked token being purchased and sending the unique token identification code obtained from the locked token being purchased to the digital security system for activation of the locked token being purchased; and the digital security system receiving the unique token identification code sent from the point-of-sale system, retrieving the token number corresponding to the locked token being purchased and sending the retrieved token number to the purchaser of the locked token being purchased, wherein a consumer upon purchasing the locked token receives a unique activation code corresponding to the locked token, enters the unique activation code, which is hashed by a hash function embedded in the locked product to create a verification hash string, and wherein the verification hash string is compared to an activation hash string and if the verification hash string matches the activation hash string, the locked token is unlocked.

27. The process of claim 26, wherein sending the retrieved token number to the purchaser of the locked token being purchased comprises sending the retrieved token number to the point-of-sale terminal at which the locked token is being purchased.

28. The process of claim 26, further comprising the digital security system sending the retrieved token number to an issuer of the token being purchased to activate the locked token.

29. The process of claim 26, wherein point-of-sale system comprises a retail check-out system.

30. The process of claim 26, wherein point-of-sale system comprises an app installed on the purchaser's device and wherein the point-of-sale system obtaining the unique token identification code from the locked token being purchased comprises the user scanning the unique token identification number with the device or entering the unique token identification number using a GUI on the device.

31. The process of claim 30, wherein sending the retrieved token number to the purchaser of the locked token being purchased comprises sending the token number to the purchaser's device.

* * * * *